United States Patent [19]

Neff

[11] 4,195,552

[45] Apr. 1, 1980

[54] PRESSURE REDUCER AND FLOW CONTROL VALVE

[75] Inventor: James A. Neff, Bloomfield Township, Oakland County, Mich.

[73] Assignee: Mac Valves, Inc., Wixom, Mich.

[21] Appl. No.: 747,421

[22] Filed: Dec. 3, 1976

[51] Int. Cl.[2] .............................................. F16K 17/18

[52] U.S. Cl. ........................................ 91/443; 91/447; 137/493.8; 137/512; 137/599

[58] Field of Search .................. 137/493, 493.7, 493.8, 137/493.9, 512, 512.3, 513.3, 513.7, 599; 91/443, 447

[56] References Cited

U.S. PATENT DOCUMENTS

| | | | |
|---|---|---|---|
| 840,876 | 1/1907 | Steedman | 91/443 |
| 1,210,891 | 1/1917 | Blanchard . | |
| 2,495,785 | 1/1950 | Stephens | 137/599 X |
| 2,499,262 | 2/1950 | Stoudt | 91/443 X |
| 2,501,483 | 3/1950 | Taylor | 91/443 X |
| 2,570,937 | 10/1951 | Gash | 137/493.8 |
| 2,881,793 | 4/1959 | Lee | 137/501 |
| 3,186,307 | 6/1965 | Ellenbogen | 91/443 X |
| 3,213,886 | 10/1965 | Pearne | 91/443 UX |
| 3,621,867 | 11/1971 | Johnson | 137/505.18 |

FOREIGN PATENT DOCUMENTS

| | | | |
|---|---|---|---|
| 1224196 | 2/1960 | France | 91/443 |

*Primary Examiner*—Robert G. Nilson
*Attorney, Agent, or Firm*—Robert G. Mentag

[57] ABSTRACT

A combination pressure reducer and flow control valve which includes a valve body and cover means having an upstream port and a downstream port, and two parallel fluid flow passages interconnecting said ports. An adjustable differential pressure valve means is operatively mounted in a first one of said two parallel fluid flow passages for reducing the upstream pressure of fluid entering the upstream port to provide a reduced downstream pressure at the downstream pressure port. A check valve means is operatively mounted in the second one of said two parallel fluid flow passages and it is operative to check the flow of fluid through said second one of said two parallel fluid flow passages when fluid is flowing through said first one of said two parallel fluid flow passages, and to allow flow of fluid through said second one of said two parallel fluid flow passages when fluid is exhausted into said downstream port and out the upstream pressure port. An adjustable fluid flow control valve means is operatively mounted in either one of said two parallel fluid flow passages to provide either a meter in or a meter out action to the flow of fluid through the passage in which the adjustable fluid flow control valve means is mounted. The function of the check valve means and the adjustable fluid flow control valve means may be incorporated in a single valve means for a meter out action. An adjustable pre-exhaust valve means may be included for quickly exhausting downstream pressure simultaneously with the exhaust of fluid flow through the check valve means.

41 Claims, 27 Drawing Figures

PRESSURE REDUCER AND FLOW CONTROL VALVE

BACKGROUND OF THE INVENTION

1. Field of the Invention

This invention relates generally to valve mechanisms, and more particularly to an improved valve mechanism which combines the functions of pressure reducing and fluid flow control. The combination pressure reducer and flow control valve of the present invention is adapted for many uses as, for example, for controlling the operation of an air cylinder in either one direction or both directions.

2. Description of the Prior Art

It is known in the valve art to provide pressure regulation to individual or multiple directional control valves with single or multiple pressure regulators to control the pressure supplied to the device being controlled. The use of multiple pressure regulators is expensive and awkward requiring special directional control valves and excessive piping. Where multiple directional valves are mounted in stacking fashion or on a common manifold base, it is extremely difficult and expensive to provide pressure regulation to individual outlets. It is not common to use such pressure regulators in the line between the outlet or cylinder port of the directional valve and the device being controlled because of cost, space and the relatively short life of diaphragms and other components of pressure regulators. It is common to provide flow control means in the line between the directional control valve and the device being controlled. Because of cost, complexity and space requirements it has not been practicable in the past to provide both pressure and flow control means between the cylinder port of the directional control valve and the device being controlled. The result has been a waste of air requiring excessive pumping capacity, a waste of energy, and increase in the cost of using air as a power and control means.

SUMMARY OF THE INVENTION

In accordance with the present invention, a combination pressure reducer and flow control valve is provided which can be installed in any cylinder or actuation line to control both the pressure and the flow of air in that line. The combination valve of the present invention includes an adjustable differential pressure valve means which is constructed and arranged to reduce the supply pressure so that only a predetermined reduction from the supply pressure is allowed to an air cylinder being controlled by the valve of the present invention as, for example, 10 psi reduction, 20 psi reduction, and so forth. The valve of the present invention also includes an adjustable flow control valve for controlling the flow of air to or from the air cylinder being controlled by the valve so as to control the return speed of the air cylinder. A check valve is provided for forcing the flow of fluid through the valve to the adjustable pressure differential valve means upon energization of the control valve, and which is operable to provide return flow through the valve from a wide open or free flow condition to a metered out fine adjustment condition in cooperation with the adjustable flow control valve. The adjustable flow control valve means may be used in series with the adjustable pressure differential means to provide a metered "in" condition, with pressure reducing and flow control, and a free flow out condition.

The combined pressure reducer and flow control valve of the present invention overcomes the disadvantages of the aforementioned prior art structures in that no separate pressure regulating device is required to reduce the pressure down to a required lower operating pressure, whereby a saving of air is provided at a minimum of cost. The pressure reducer and flow control valve of the present invention also provides a control over the speed of an air cylinder, whereby the air cylinder may be efficiently operated in either direction and at a savings of air. The valve of the present invention is advantageous in that it provides in one compact and economical unit the combined functions of pressure reducing and flow control.

The combination pressure reducer and flow control valve of the present invention can be used for a metered "in" or metered "out" control operation on an air cylinder with free flow in the opposite direction. The combination pressure reducing and flow control valve of the present invention also includes in one embodiment a pre-exhaust function which provides a quick dump exhaust characteristic in addition to the pressure reducing and flow control characteristics.

Other features and advantages of this invention will be apparent from the following detailed description, appended claims, and the accompanying drawings.

DESCRIPTION OF THE PREFERRED EMBODIMENTS

Figure 1:
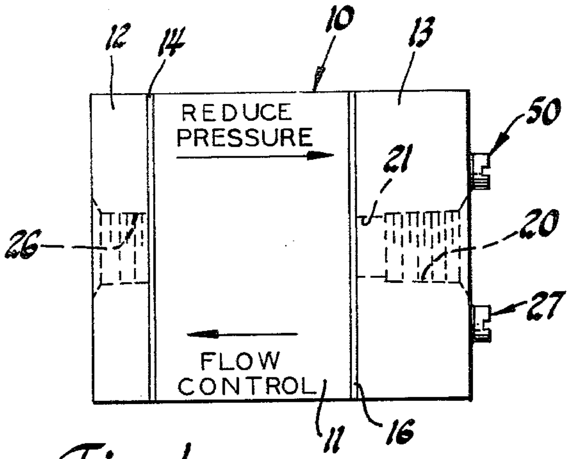
FIG. 1 is a side elevation view of a first embodiment of a combination pressure reducer and flow control valve made in accordance with the principles of the present invention.
Figure 3:
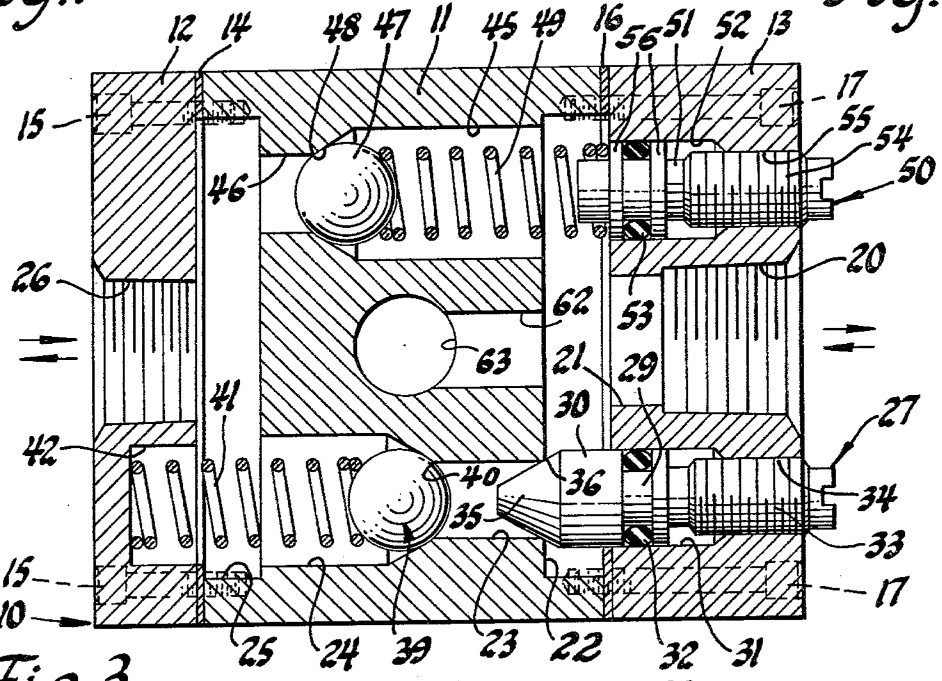
FIG. 3 is a an elevation section view of the valve structure illustrated in FIG. 2, taken along the line 3—3 thereof, and looking in the direction of the arrows.

Referring now to the drawings, and in particular to FIGS. 1 and 3, the numeral 10 generally designates a first illustrative embodiment of a combination pressure reducer and flow control valve made in accordance with the principles of the present invention. The valve 10 includes a valve body 11, an end cover 12, and a retainer member 13. A suitable gasket 14 is disposed between the valve body 11 and the end cover 12. The end cover 12 is secured to the valve body 11 by any suitable means, as by suitable machine screws 15. A suitable gasket 16 is also disposed between the valve body 11 and the retainer member 13. The retainer member 13 is secured to the valve body 11 by suitable means, as by suitable machine screws 17. The retainer member 13 is provided with a threaded outlet port 20 which would be connected by suitable conduit means to one end of an air cylinder or other device to be supplied with a controlled fluid supply. The port 20 communicates through a passageway 21 with a chamber or passageway 22. The chamber 22 is connected by two parallel passages or paths to a supply or inlet port 26. As shown in FIG. 3, the chamber 22 is connected to a passageway 23 which communicates with a passageway 24 and a chamber 25 that communicates with the supply port 26. The flow of fluid between the chamber 22 and the passageway 23 is controlled by an adjustable flow control valve means, generally indicated by the numeral 27.

As shown in FIG. 3, the adjustable flow control valve means 27 includes a valve body 30 which has a conically shaped nose 35 that is adapted to engage and seat in an orifice or valve seat 36 at the junction of the chamber 22 and passageway 23 when the flow control valve means 27 is adjusted inwardly to the closed position as shown in FIG. 3. The valve body 30 is slidably mounted in a bore 31 and aligned with the passageway 23, which is formed in the retainer member 13. The valve body 30 is provided with an integral valve stem 29. A suitable O-ring seal means 32 is formed around the valve stem 29 and engages the bore 31. The valve stem 29 includes a threaded portion 33 which is threadably mounted in a bore 34 that is aligned with the valve bore 31. The end of the threaded stem portion 33 extends outwardly of the retainer member 13 and it is provided with a cross cut for adjustment of the flow control valve means 27 by a screwdriver or the like.

As shown in FIG. 3, the passageway 23 is smaller in diameter than the passageway 24, and these passageways are connected by a tapered passageway 40 which forms a valve seat for a ball check valve 39. The ball check valve 39 is normally biased into a closed position on the valve seat 40 by a spring 41. The inner end of the spring 41 engages the ball check valve 39 and the outer end of the spring 41 is seated in a suitable recess 42 that is formed in the valve end cover 12 in alignment with the passageway 24.

As shown in FIG. 3, the chamber 22 is also connected by a parallel path with the supply port 26, by means of the passageways 45 and 46. The passageway 46 is of a smaller diameter than passageway 45, and these passageways are connected by a tapered passageway 48 which forms a seat for a poppet valve 47. The poppet valve 47 is shown as a ball valve, and it comprises a part of an overall differential pressure valve means, generally indicated by the numeral 50, which functions as a pressure reducing means. The ball valve 47 functions as a poppet valve and may take other shapes, as shown hereinafter in other embodiments of the invention.

The adjustable differential pressure valve means 50 includes a spring 49 which has one end in abutment with the poppet ball valve 47, and the other end seated around the inner end of a spring pressure adjustment shaft 51. The valve spring pressure adjusting shaft 51 includes a pair of radially extended shoulders 56 between which is mounted a suitable O-ring seal means 53. The outer end of the spring 49 is seated against the inner shoulder 56 on the shaft 51. The shaft 51 is slidably mounted in a bore 52 in the retainer member 13 that communicates with the chamber 22 and the passageway 45. The shaft 51 has a threaded outer end 54 which is threadably mounted in a threaded bore 55 in the retainer member 13. The outer end of the shaft threaded portion 54 extends outwardly of the retainer member 13, and it is provided with a cross slot for insertion of a suitable tool for adjusting the shaft 51 inwardly or outwardly to adjust the spring pressure on the poppet valve 47 for controlling the differential pressure between the supply or upstream pressure and the reduced or downstream pressure. The numeral 62 designates a passageway for connecting the chamber 22 to a gage port 63 for a downstream pressure gage.

Figure 2:
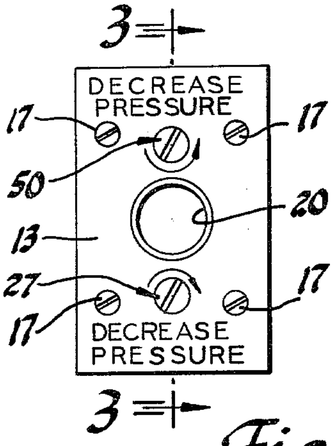
FIG. 2 is a right side elevation view of the valve structure illustrated in FIG 1.

In use, the combination pressure reducing and flow control valve illustrated in FIGS. 1 through 3 is adapted to provide a pressure reducing function when the fluid flow is in one direction, and a metering out or flow control function when the fluid flow is in the other direction. For example, with supply air flowing into the chamber 25 through the port 26, the air is blocked by the check valve 39 from passing through the passageway 23, but it is permitted to flow through the passageways 46 and 45 and into the chamber 22 and out the port 20. The downstream pressure flowing out of the port 20 is at a lower pressure than the plant or supply pressure entering port 26.

The differential between the upstream pressure entering port 26 and the downstream pressure exiting out of port 20 is determined by the differential between the force of the poppet valve spring 49 and the upstream pressure applied at the area across the valve seat 48. At a given pressure, depending upon the adjustment of the spring pressure on the poppet valve 47, the poppet valve 47 will open and allow fluid flow thereby and out through the port 20. The pressure reduction thus provided by the poppet valve 47 depends upon the adjustment of the valve shaft 51 and the corresponding pressure exerted by the spring 49 on the poppet valve 47. Although the adjustable poppet valve means 50 is an adjustable differential pressure valve means, it will be understood that once it is adjusted it provides a fixed differential between the upstream and downstream pressures, which provides the desired pressure reducing effect desired. For example, the poppet valve 47 can be adjusted to open so as to provide downstream pressure of 10 psi reduction of the supply pressure, 20 psi reduction of the supply, 50 psi reduction of the supply, or whatever pressure reduction is desired.

When the air cylinder to which the valve 10 is connected is to be reversed, the air flow from the cylinder enters the port 20 and it cannot pass through the passage 45 to the port 26 because that passageway is blocked by the valve 47. The exhausting air flows through the chamber 22 and past the adjustable flow control valve means 27 which would be set at a desired opening to control the fluid flow thereby, so as to control the return speed of the cylinder. The exhaust air then passes through the passageway 23 and opens the check valve 39 and passes through the passageway 24 and the chamber 25 and out the port 26.

Figure 4:
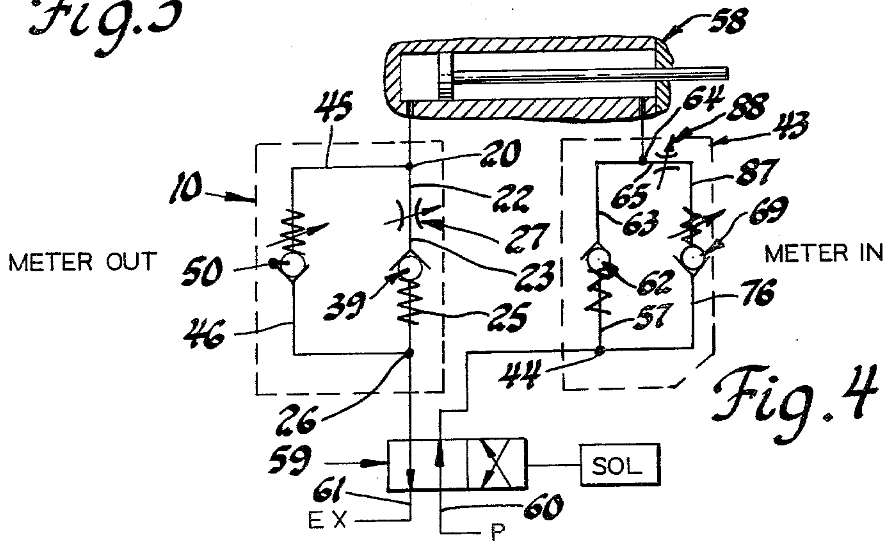
FIG. 4 is a schematic view of an illustrative flow control circuit embodying the use of the meter out valve structure illustrated in FIGS. 1 through 3 and later disclosed meter in valve structure.

FIG. 4 illustrates a use of the illustrative embodiment of FIG. 3 for controlling the admission and exhaustion of air into and from the head end of an air cylinder 58, so as to provide a pressure reduced flow of air into the head end of the cylinder 58 during a working stroke, and a meter out action on air exhausted from the head end of the cylinder 58 during a return stroke. FIG. 4 also illustrates the use of a modified combination valve, generally indicated by the numeral 43, for providing a pressure reduction and a meter in action on air flowing into the rod end of the air cylinder 58 during a return stroke, and a free flow exhaustion of air from the rod end of the air cylinder 58 during a working stroke. The numeral 59 generally indicates a four-way solenoid operated control valve which is connected to a pressurized air supply line 60 and an exhaust line 61.

One port of the control valve 59 is connected to the head end of the air cylinder 58 through a combination meter out valve 10, and another port is connected to the cylinder rod end of the air cylinder 58 through a combination meter in valve, generally indicated by the numeral 43. It will be seen that air at plant pressure is supplied to the four-way control valve 59, and that when the control valve 59 is in the position shown in FIG. 4, air under plant pressure is supplied from the supply line 60 to the upstream port 44 of the meter in combination valve 43 from one port of the control valve 59, and the other port of the control valve 59 is connected to the upstream port 26 of the meter out combination valve 10. The plant pressure air flowing through the upstream port 44 of the valve 43 flows through the passageway 76 and through a pressure reducing valve, generally indicated by the numeral 69, and thence through a passageway 87, a flow control valve generally indicated by the numeral 88, a passageway 65, and out through a downstream port 64 and into the cylinder rod end of the cylinder 58. Simultaneously, air is exhausted from the head end of the cylinder 58 into the downstream port 20 of the valve 10 and into the passageway 22. The exhausting air then flows through a flow control valve, generally indicated by the numeral 27, and past a check valve 39, and thence out through the upstream port 26 and through the control valve 59 into the exhaust line 61. When the control valve 59 is shifted to reverse the port settings shown in FIG. 4, the air from the supply line 60 will enter the upstream port 26 of the combination valve 10 and pass through the passageway 46 and the pressure reducing valve 50 into the passageway 45, and thence out the downstream port 20 and into the head end of the cylinder 58. Simultaneously, air is exhausted from the cylinder rod end of the cylinder 58 into the downstream port 64 from whence it passes through the passageway 63, the check valve 62, and the passageway 57 to the upstream port 44. The air is exhausted from the upstream port 44 in a free flow manner into the control valve 59 and into the exhaust line 61.

Figure 5:
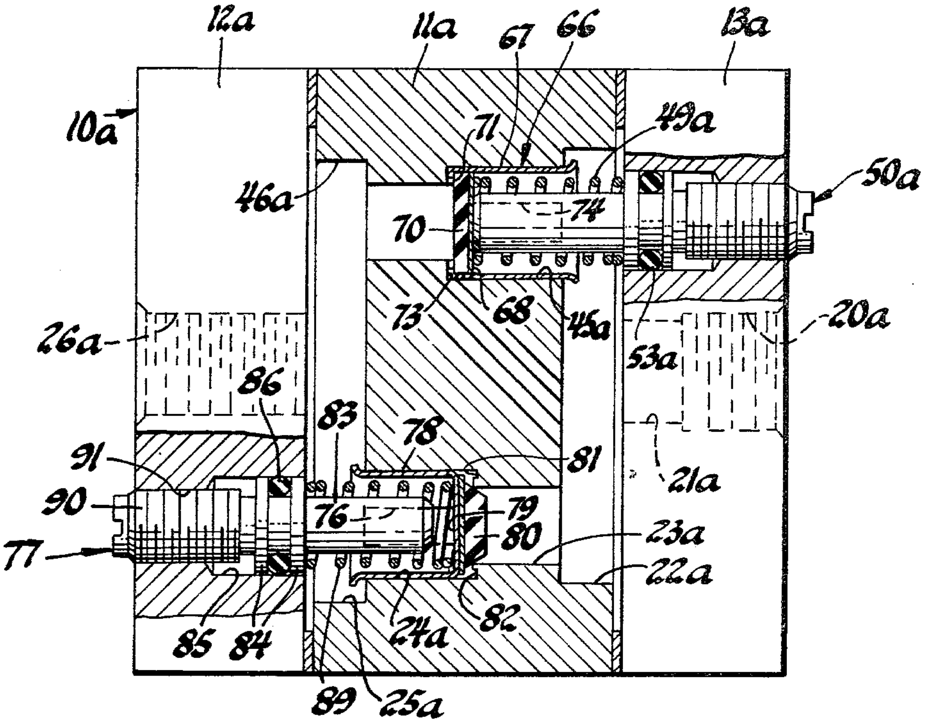
FIG. 5 is an elevation section view, similar to FIG. 3, and showing a modification of the valve of FIG. 3 in which a combined flow control and check valve means is employed in a valve made in accordance with the principles of the present invention.

FIG. 5 is an elevation section view, similar to FIG. 3, and showing a modification of the valve structure of FIG. 3 in which a combined flow control and check valve means is employed. The various parts of the valve illustrated in FIG. 5 which are the same as the parts in the valve shown in FIG. 3 have been marked with the same reference numerals followed by the small letter "a".

In the embodiment of FIG. 5, the adjustable differential pressure valve means comprises a poppet type valve, generally indicated by the numeral 66, instead of the ball type valve employed in the first embodiment of FIG. 3. The poppet valve 66 includes a cup shaped body 67 which is slidably mounted in the bore 45*a*. A valve spring 49*a* extends into the open outer end of the cup shaped valve body 67, and seats against an inner end wall 68. A flat valve seal 70, made from a suitable elastomeric material, is molded and bonded on the inner end of the cup shaped body 67. The flat valve seal 70 is adapted to be seated on a flat circular valve seat 71 which is formed at the junction of the passageways 46*a* and 45*a*. The passageway 45*a* extends inwardly beyond the valve seat 71 to form an annular recess 73 around the valve seat 71 to provide for an efficient and accurate seating of the valve seal 70 on the seat 71. A pair of sidewardly extended passageways 74 connect the chamber 22*a* and the valve seat 71 for fluid flow into the chamber 22*a* when the valve body 67 is moved to an open position. In operation, the adjustable differential pressure valve means illustrated in FIG. 5 functions in the same manner as the ball valve means 47 in the first described embodiment of FIGS. 1 through 3, to provide a pressure reducing action on fluid flowing between the upstream pressure port 26*a* and the downstream pressure port 20*a*.

In the embodiment of FIG. 5, the functions of the flow control valve and check valve have been combined in a combined valve structure, generally indicated by the numeral 77. The combined valve means 77 includes a valve having a cup-shaped body 78 which is slidably mounted in the passageway 24*a*. The cup-shaped body 78 is provided with an inner end wall 79, on the outer face of which is bonded a conically shaped nose seal 80. The valve seal 80 is adapted to be operatively seated on an annular valve seat 81 formed at the inner end orifice of the passageway 23*a*. The passageway 24*a* is extended inwardly beyond the valve seat 81 to form therearound an annular recess 82. A pair of sidewardly extended passageways 76 connect the chamber 24*a* and the valve seat 81 for fluid flow between the chamber 25*a* and the passage 23*a* when the valve body 78 is moved to an open position. An adjustable valve shaft or stem 83 is extended into the cup-shaped valve body 78 and its inner end is set relative to the inner end wall 79 to set the adjusted open position of the valve body 78. The valve stem 83 is provided with a pair of spaced annular flanges 84 which are slidably mounted in a bore 85 in the valve cover portion 12*a*. A suitable O-ring seal means 86 is mounted between the flanges 84. The rod attached to adjusting screw 50*a* functions in the same manner as the stem 83 of the valve means 77 so as to limit the amount of opening of valve 70.

The valve stem 83 is provided with an integral threaded end or screw end 90 which is threadably mounted through a threaded bore 91 in the end cover 12*a*. The threaded bore 91 communicates with the bore 85. It will be seen that the valve stem 83 can be adjusted outwardly to a desired setting wherein during an exhaustion of fluid from the downstream port 20*a*, through the passageways 22*a*, 23*a*, 24*a*, 76 and 25*a*, to the upstream port 26*a*, the cup-shaped valve body 78 will be moved to the left, as viewed in FIG. 5, by the fluid pressure to an open position in abutment with the valve stem 83 to permit a predetermined and controlled flow of fluid therethrough. The combination flow control and check valve means 77 thus functions to provide a meter out action to the fluid passing thereby. It will also be seen that the cup-shaped valve 78 functions as a check valve when fluid is flowing through the valve in the opposite direction through the adjustable differential pressure valve means 50*a*, and will be moved to the closed position shown in FIG. 5.

Figure 6:
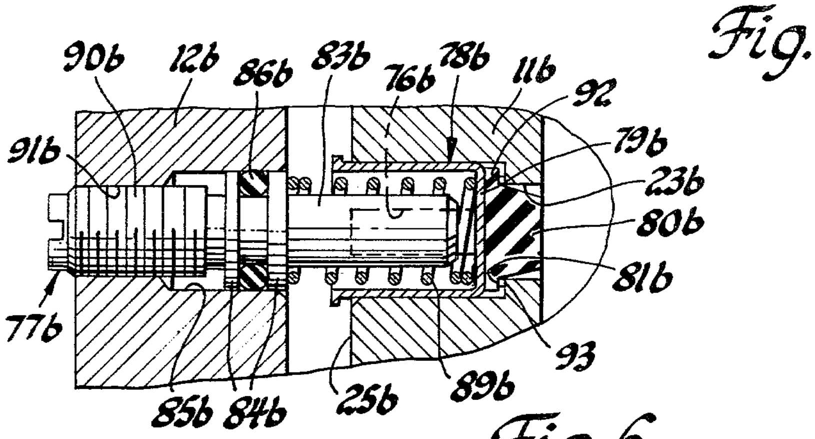
FIG. 6 is a fragmentary view of a further modified combination flow control and check valve means which may be employed in a valve made in accordance with the principles of the present invention.

FIG. 6 is a fragmentary view of a further modified combination flow control and check valve means which may be employed in valves made in accordance with the principles of the present invention. The parts of the valve structure illustrated in FIG. 6 which are the same as the valve parts illustrated in FIG. 5, have been marked with the same reference numerals followed by the small letter "b". The difference between the valve structure illustrated in FIG. 6 and that of FIG. 5 is that the front nose seal 80*b* has been formed differently so as to provide a flat annular flange 92 around the inner end thereof which has its outer face seated on the flat valve seat 81*b*, when the cup-shaped valve body 78*b* is in the closed position as shown in FIG. 6. In the last mentioned condition, the taper of the periphery of the conically shaped seal 80*b* is such that the point of intersection of the conical periphery with the flat outer face of the flange 92 is precisely positioned at the orifice edge 93 formed by the valve seat 81*b*, whereby only a slight movement of the cup-shaped valve body 78*b* opens and closes the flow of fluid past the valve seat 81*b*. The combination flow control and check valve 77*b* illustrated in FIG. 6, functions in the same manner as the corresponding valve 77 illustrated in FIG. 5.

FIGS. 7 through 16 illustrate a further valve embodiment, generally indicated by the numeral 95, and which incorporates a pressure reducer function and a flow control meter out function. The valve 95 includes a valve body 96, an upper cover 97 and a lower cover 98. The covers 97 and 98 are secured to the body 96 by a plurality of suitable screws 99, which extend through the upper cover 97 and the body 96, and threadably engage the bottom cover 98. Suitable seal means 100 are provided between the covers 97 and 98, and the body 96. The valve body 96 is provided with a supply or upstream pressure port 103 which communicates with an interior lower passageway 104, formed by the combined structure of the valve body 96 and the lower cover 98. The valve body 96 further includes a downstream port 105 which communicates with an interior upper passageway 106, formed by the combined structure of the valve body 96 and the upper cover 97.

Figure 9:
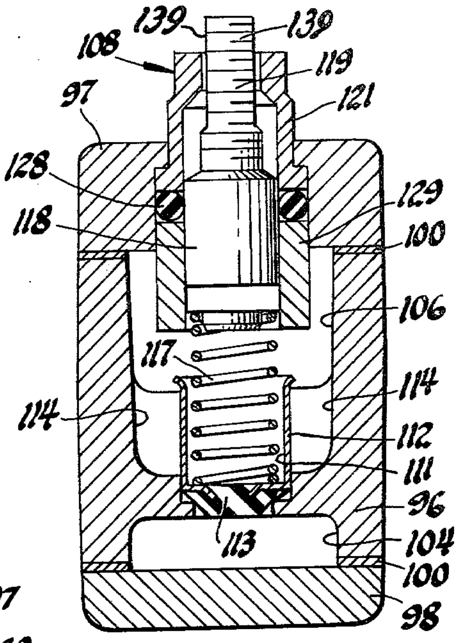
FIG. 9 is an elevation section view of the valve structure illustrated in FIG. 8, taken along the line 9—9 thereof, and looking in the direction of the arrows.
Figure 8:
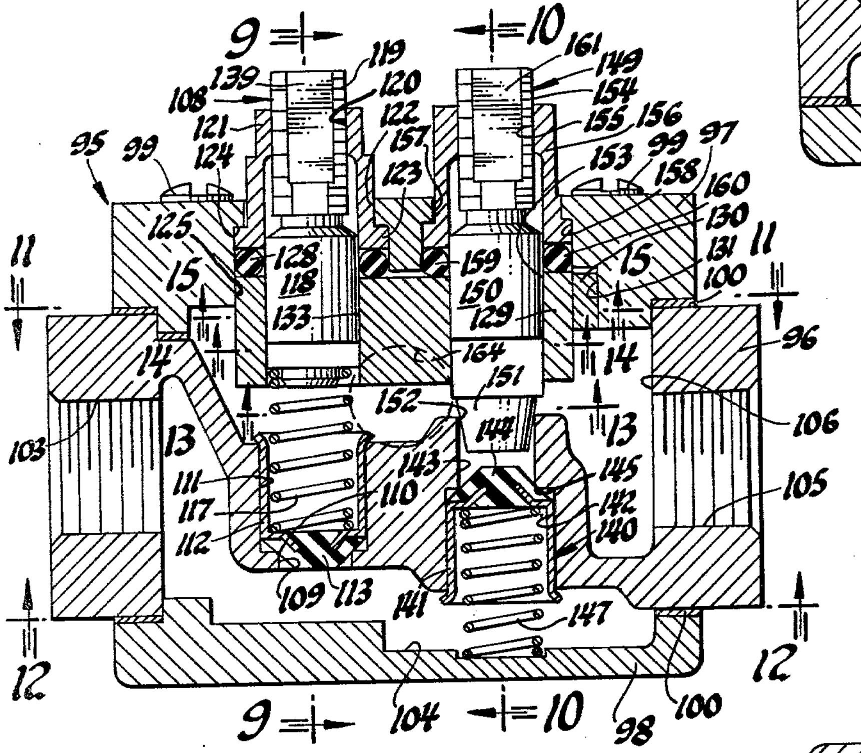
FIG. 8 is an elevation section view of the valve structure illustrated in FIG. 7, taken along the line 8—8 thereof, and looking in the direction of the arrows.

As shown in FIG. 8, the valve 96 includes an adjustable differential pressure valve means, generally indicated by the numeral 108, which interconnects the passageways 104 and 106. An orifice 109 communicates the lower passageway 104 with a valve bore 111 which communicates with the upper passageway 106. A valve seat 110 is formed at the inner end of the orifice 109. A cup-shaped valve body member 112 is slidably mounted in the valve bore 111, and it has a conically shaped nose seal 113 which is bonded on the front outer end thereof, and adapted to be seated on the valve seat 110 when the valve body member 112 is in the closed position, as shown in FIG. 8. As shown in FIG. 9, the valve bore 111 communicates through a pair of sidewardly extended passageways 114 with the upper passageway 106 when the valve body member 112 is in an open position. The valve body member 112 is a poppet type valve, and although the nose seal 113 is conically shaped, it will be understood that this seal could also be provided with a flat form, as of the type shown in FIG. 5, if desired.

As shown in FIG. 8, the cup-shaped valve body member 112 is normally biased to a closed position on the valve seat 110 by a suitable spring cushion 117 which has its one end seated inside of the cup-shaped valve body member 112 and the other end seated against an adjustable valve shaft or stem 118. The outer end 119 of the valve stem 118 is threaded, and it is threadably mounted in a threaded bore 120 formed in the upper outer end of a cylindrical adjusting knob 121. The knob 121 is freely rotatable in a vertical bore 122 formed through the top cover 97. The bore 122 communicates with a large chamber 125 that communicates with the passageway 106. The intersection between the bore 122 and the chamber 125 provides a shoulder 124 against which an enlarged flange 123 on the lower end of the knob 121 is adapted to be rotatably seated.

Figure 13:
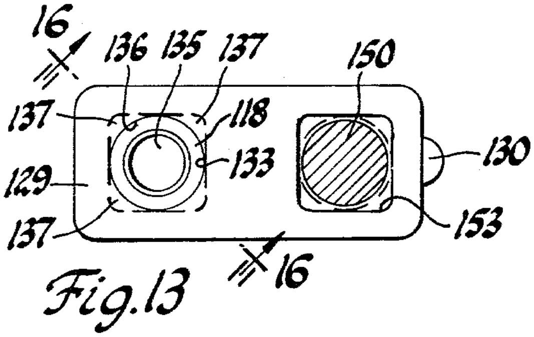
FIG. 13 is a fragmentary, horizontal section view of the valve structure illustrated in FIG. 8, taken along the line 13—13 thereof, and looking in the direction of the arrows.
Figure 14:
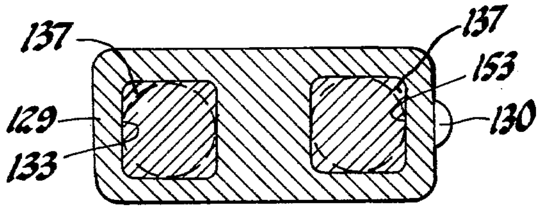
FIG. 14 is a fragmentary, horizontal section view of the valve structure illustrated in FIG. 8, taken along the line 14—14 thereof, and looking in the direction of the arrows.
Figure 15:
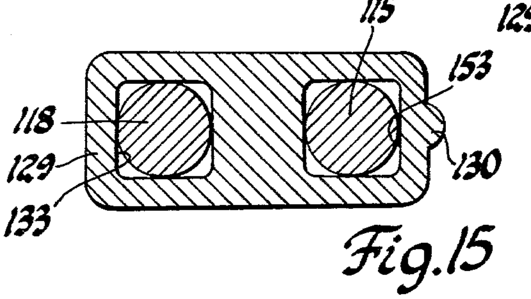
FIG. 15 is a fragmentary, horizontal section view of the valve structure illustrated in FIG. 8, taken along the line 15—15 thereof, and looking in the direction of the arrows.

The lower end of the adjusting knob 121 is rotatably seated on a suitable O-ring seal means 128, which in turn seats on the upper face of a retainer member 129. As shown in FIG. 13, the retainer member 129 is rectangular in overall plan configuration, and it is secured in place in the chamber 125 by the spaced apart, integral ribs 126 which project up from the body 11. An integral locating projection 130 is formed on one end of the retainer 129, and it is adapted to be seated in a mating recess 131 in the upper cover 97, as shown in FIG. 8.

Figure 16:
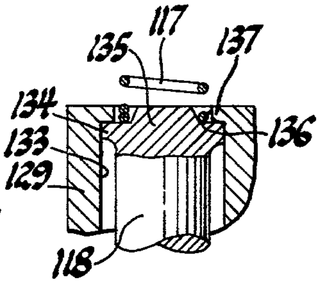
FIG. 16 is a fragmentary, elevation section view of the structure illustrated in FIG. 13, taken along the line 16—16 thereof, and looking in the direction of the arrows.

As shown in FIGS. 8 and 16, the adjustable valve stem 118 extends downwardly into a square hole 133 formed in the upper side of the retainer 129. The body of the adjustable valve stem 118 is circular in cross section, but it is provided at its lower end with a square, outwardly extending flanged end 134. As best seen in FIGS. 13 and 16, the lower end face of the valve stem 113 is provided with a round extension 135 which extends downwardly through a circular opening 136 formed through the lower end of the retainer 129. The square hole 133 terminates at the inner end of the round hole 136 in the retainer 129, to provide four corner stop members 137 which limit the downward movement of the square end 134 of the valve stem 118. The upper end of the spring cushion 117 is seated around the round lower end 135 of the valve stem 118.

Figure 7:
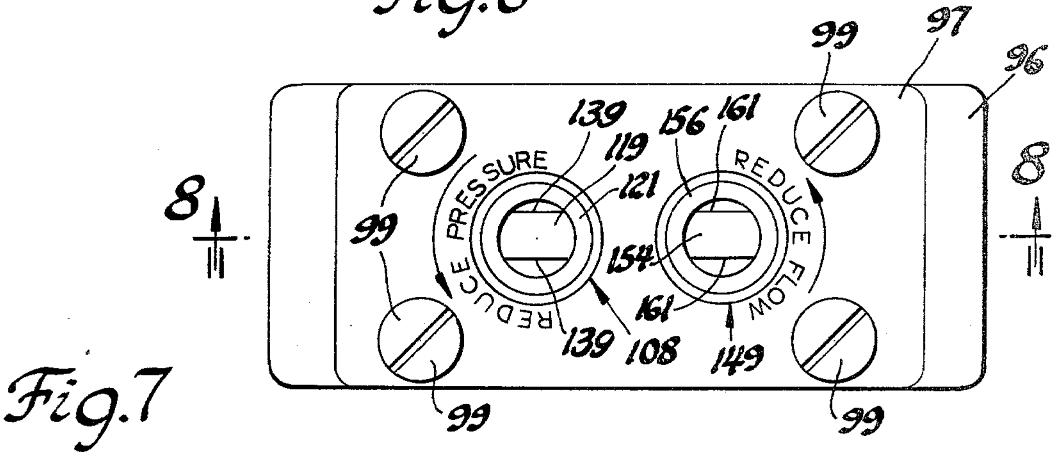
FIG. 7 is a top plan view of a further valve embodiment made in accordance with the principles of the present invention.

As shown in FIGS. 7, 8 and 9, the upper end 119 of the adjustable valve stem 118 is provided with a pair of oppositely disposed flat surfaces 139, on which may be provided suitable position indicator indicia to assist in adjusting the pressure on the spring cushion 117, as desired. The pressure on the spring cushion 117 is adjusted by turning the knob 121 in the desired direction to either move the valve stem 118 inwardly or outwardly. It will be seen that because of the square inner end 134 of the valve stem 118, that the valve stem 118 will not turn in the square hole 133 in the retainer 129. The rotation of the knob 121 about the valve stem threaded upper end portion 119 provides for linear or straightline up and down movement of the valve stem 118 in the square hole 133. The valve stem 118 can be adjusted downwardly to a bottom position where it engages the stop members 137, as shown in FIG. 16. It will be understood that the valve stem 118 would be set to provide for an opening of the valve cup body member 112 at a desired reduced pressure setting.

In FIG. 8, when fluid is flowing past the pressure reducing valve body member 112, it is prevented from flowing through the second parallel passageway means by a check valve generally indicated by the numeral 140. The check valve 140 is shown in the form of a poppet valve, which has a cup-shaped body 141 that is slidably mounted in a bore 142 that communicates with the lower passageway 104. The bore 142 communicates with a passageway 143 which in turn communicates with the upper passageway 106. The junction point of the passageway 143 and valve bore 142 forms a valve seat 145 against which is seated the conical nose seal 144, which is bonded to the front end of the valve body member 141, when the check valve 140 is in the closed position, as shown in FIG. 8.

Figure 10:
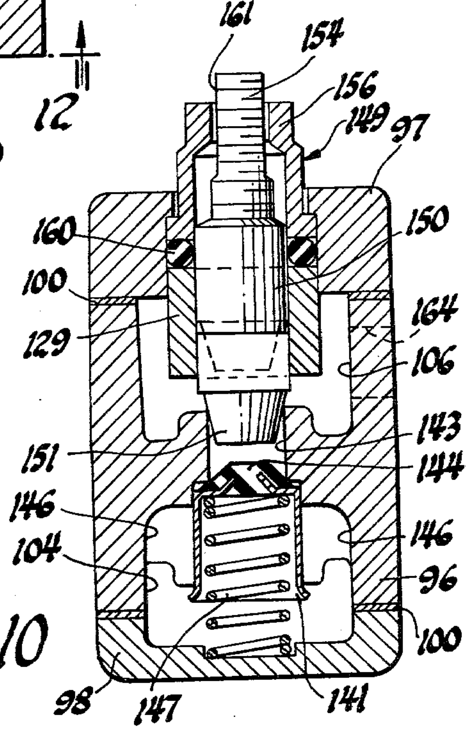
FIG. 10 is an elevation section view of the valve structure illustrated in FIG. 8, taken along the line 10—10 thereof, and looking in the direction of the arrows.
Figure 11:
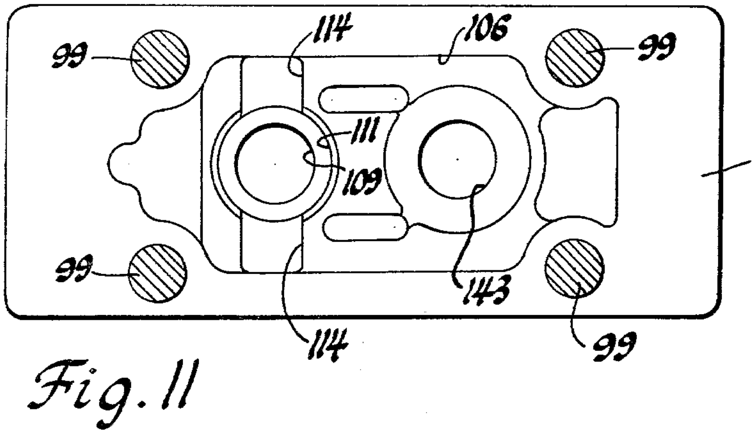
FIG. 11 is a top plan view of the valve body structure illustrated in FIG. 8, with the top cover plate removed, taken along the line 11—11 thereof, and looking in the direction of the arrows.
Figure 12:
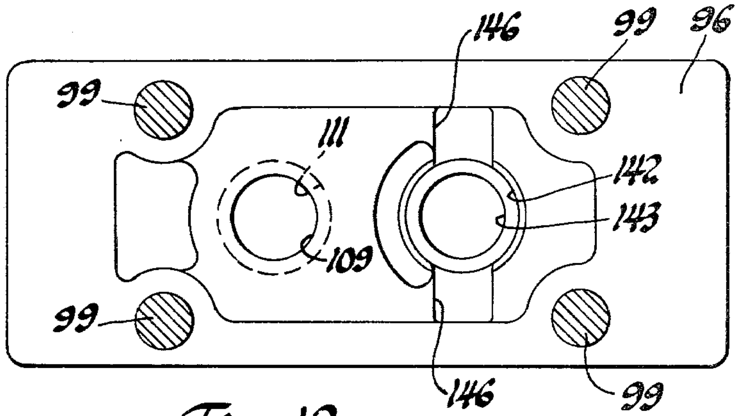
FIG. 12 is a bottom plan view of the valve body illustrated in FIG. 8, with the bottom cover plate removed, taken along the line 12—12 thereof, and looking in the direction of the arrows.

As shown in FIG. 10, the valve bore 141 communicates with the lower passageway 104 when the check valve 140 is in an open position through a pair of sidewardly extended passageways 146. The check valve 140 is normally biased to the closed position, as shown in FIG. 8, by a suitable spring cushion 147 which has its upper end seated inside the cup-shaped valve body member 141 and its lower end in abutment with the inner wall of the lower passageway 104 in the lower cover 98.

The valve 95 is provided with an adjustable fluid flow control means, generally indicated by the numeral 149, and which includes an adjustable valve stem 150 that carries an integral, conically shaped nose valve 151. The upper end of the passageway 143 forms an orifice 152 which functions as a valve seat for operative engagement with the conical nose valve 151. The conical valve 151 is shown in the closed position in FIG. 8. The upper end 154 of the stem 150 is threaded, and it is threadably mounted in a threaded bore 155 formed through the upper end of an adjusting knob 156. The adjusting knob 156 is rotatably mounted in a bore 157 formed through the upper cover 97. The lower end of the adjusting knob 156 is enlarged to form a flange which is rotatably mounted in a larger bore 158 which communicates with the bore 157 and forms a shoulder 159 against which the upper face of the enlarged lower end of the knob 156 is rotatably seated. The lower end of the knob 156 is rotatably mounted on a suitable stationary seal 160. As shown in FIGS. 7 and 10, the upper end 154 of the valve stem 150 is provided with a pair of opposite flat surfaces 161 for the marking thereon of suitable position indicator indicia for indicating the adjusted position of the valve 151 relative to the valve seat 152. As shown in FIGS. 8 and 10, the valve 95 may be provided with a suitable gage port 164 which communicates with one side of the upper passageway 106.

In use, the adjustable differential pressure valve means 108 would be set to a desired setting to give a desired pressure reducing effect to fluid flowing into the supply port 103 and thence to the lower passageway 104 and past the valve member 112, and into the upper passageway 106 and out the port 105. The adjustable fluid flow control means 149 would be set to a desirable flow control position, so as to control the rate of flow of fluid flowing back through the valve from a device which is being controlled by the valve 95. The return flow through the valve 95 would enter the port 105 and then flow into the upper passageway 106 and down through the passageway 143 into the lower passageway 104 and out through the upstream port 103. It will be seen that the valve 95 thus provides a pressure reducing function for fluid flow therethrough in one direction, and a meter out flow control function when fluid is flowing through the valve in the opposite direction.

Figure 17:
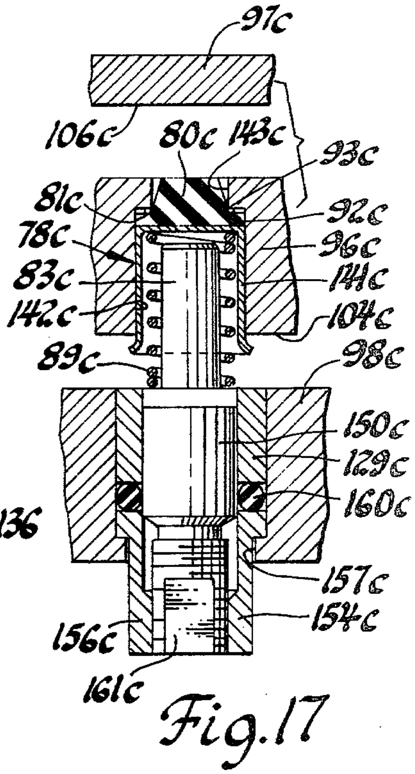
FIG. 17 is a fragmentary, section view of a modified combination flow control and check valve means which may be employed in the valves made in accordance with the principles of the present invention.

FIG. 17 is a fragmentary, section view of a modified combination flow control and check valve means which may be employed in the valve illustrated in FIGS. 7 through 16. The combination valve illustrated in FIG. 17 employs the conically shaped poppet valve employed in the combination valve of FIG. 6 and the nonrotating, linearly movable valve stem structure employed in the valve illustrated in FIG. 8. The parts of the combined valve structure illustrated in FIG. 17 which are the same as the parts shown in the valve structures of FIGS. 6 and 8, have been marked with the same reference numerals followed by the small letter "c". The combined flow control and check valve structure of FIG. 17 will function in the same manner as the combined valve of FIG. 6. The valve illustrated in FIG. 17 would be adjusted in the same manner as described hereinbefore for the adjustment of the flow control valve 149 of FIG. 8.

Figure 18:
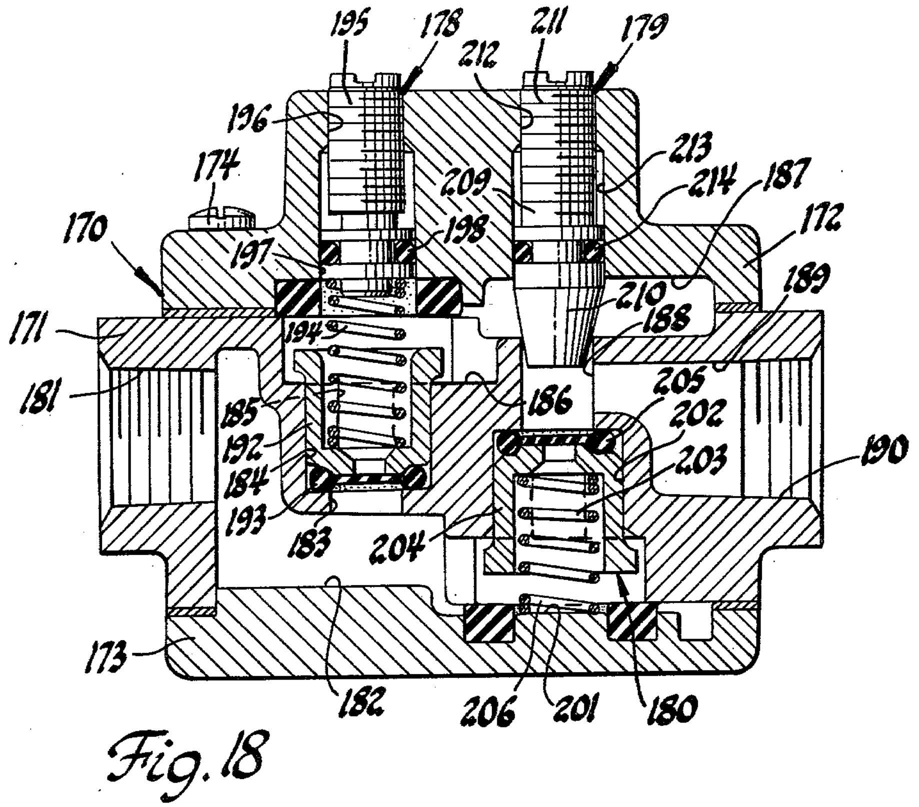
FIG. 18 is an elevation section view of another valve embodiment made in accordance with the principles of the present invention, and illustrating a meter in function.

FIG. 18 is an elevation section view of another valve embodiment, generally designated by the numeral 170, which provides a pressure reducing function and a flow control meter in function. The valve 170 includes a valve body 171, an upper cover 172, and a lower cover 173. The covers 172 and 173 are secured to the body 171 by a plurality of suitable screws 174 which extend through the upper cover 172 and the body 171, and threadably engage the bottom cover 173. Suitable seal means are provided between the upper and lower covers 172 and 173, respectively, and the body 171.

The valve body 171 is provided with a supply or upstream pressure port 181 which communicates with an interior lower passageway 182, formed by the combined structure of the valve body 171 and the lower cover 173. The valve body 171 further includes a downstream port 190, which communicates with an interior upper passageway 187, formed with the combined structure of the valve body 171 and the upper cover 172. The passageway 182 communicates through a vertical bore 183 and a valve bore 184, a passageway 185 and a passageway 186 with the passageway 187. Passageway 187 communicates through a vertical bore 188 and the passageway 189 with the port 190.

The valve 170 is provided with an adjustable differential pressure valve means, generally indicated by the numeral 178, an adjustable fluid flow control valve means, generally indicated by the numeral 179, and a check valve means generally indicated by the numeral 180.

The adjustable differential pressure valve means 178 includes a cup-shaped valve body member 192 which is slidably mounted in the valve bore 184, and which has a suitable valve nose seal 193 that is molded on the front end thereof for closing the upper end orifice of the passageway 183 when the valve member 192 is in the closed position shown in FIG. 18.

The valve member 192 is normally biased to the closed position shown in FIG. 18 by a suitable spring cushion or spring means 194 which has its lower end seated in the valve body member 192 and its upper end seated against the lower end of a suitable adjusting valve stem 195. The valve stem 195 has its upper end threadably mounted in a suitable threaded bore 196 in the upper cover 172. The valve stem 195 has its lower end slidably mounted in a bore 197 which communicates with the threaded bore 196. The valve stem 195 is provided with suitable O-ring seal means 198. It will be understood that adjustment of the valve stem 195 upwardly and downwardly adjusts the pressure on the spring cushion 194 to a predetermined amount to provide a desired pressure reducing action on fluid flowing through the passageway 183 and past the valve body member 192.

As shown in FIG. 18, the check valve 180 includes a cup-shaped body 204 which is slidably mounted in a valve bore 202 that communicates with a lower passageway 201. The lower passageway 201 communicates with the passageway 182 and the port 181. The valve bore 202 also communicates with the lower passageway 201 through a pair of sideward, outwardly extended passageways 203. The valve bore 202 communicates with the valve bore 188 and the passageway 189 and the downstream port 190. The lower end of the valve bore 188 is adapted to be normally closed by the check valve body member 204 which is biased to the closed position shown in FIG. 18 by a suitable spring cushion or spring means 206. The valve body member 204 carries a suitable valve nose seal 205 which is bonded on the front end thereof, for enclosing the lower end orifice of the valve bore 188.

The adjustable flow control valve means 179 is shown in the closed position in FIG. 18, and it includes a valve stem 209 which carries on its lower inner end a conical valve 210 which is engageable with the orifice formed in the upper end of the bore 188 for controlling the flow of fluid between the upper passageway 187 and the valve bore 188. The valve stem 209 is provided with a threaded upper end 211 which is threadably mounted in a threaded bore 212 in the upper cover 172. The valve stem 209 has its lower end slidably mounted in a bore 213 which is aligned with the threaded bore 212. The valve stem 209 is provided with a suitable O-ring seal means 214.

The valve 170 functions to provide a pressure reducing function on fluid flowing therethrough when fluid enters the upstream port 181 and passes through the passageway 182, the bore 183, the bore 184, the passageway 185, and thence into the passageway 186. Fluid then flows into the passageway 187, and past the flow control conical valve 210 to provide a desired flow control on the fluid flowing thereby. The controlled flow of fluid then passes into the bore 188 and into the passageway 189 and out the downstream port 190. The check valve 180 is in the closed position shown in FIG. 18 during the last mentioned pressure reducing and flow controlling actions. When fluid is returned through the valve 170, it enters the downstream port 190 and passes into passageway 189 and into the bore 188 and thence downwardly to open the check valve 180 to provide a free flow through the passageways 203, 201 and 182 and out through the upstream port 181.

Figure 19:
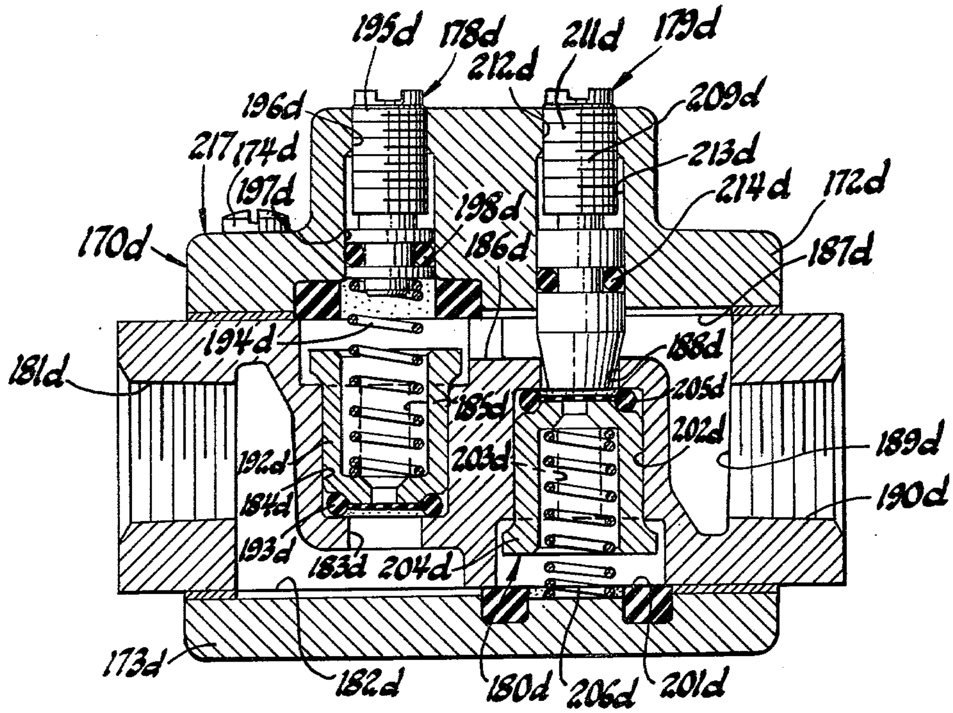
FIG. 19 is an elevation section view of a further valve embodiment made in accordance with the principles of the present invention, and illustrating a meter out function.
Figure 20:
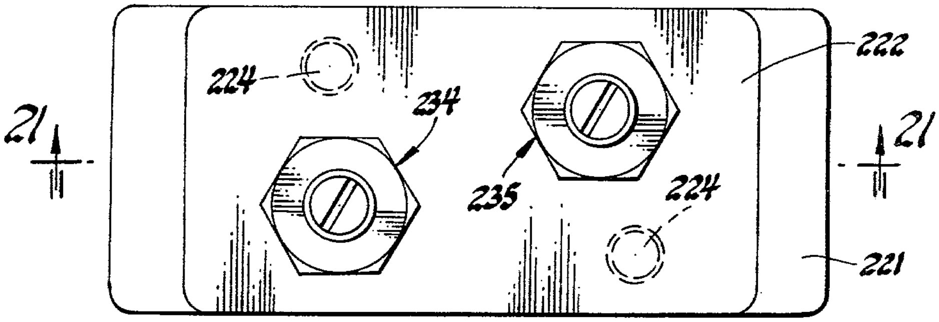
FIG. 20 is a top plan view of still another valve embodiment made in accordance with the principles of the present invention.

FIG. 19 shows a further valve embodiment, generally indicated by the numeral 217, and it incorporates a pressure reducer function and a flow control meter out function. Valve 217 is substantially the same as valve 170 of FIG. 18, and the parts of the embodiment of FIG. 19 which are the same as the parts of the embodiment of FIG. 18 are marked with the same reference numerals followed by the small letter "d".

The structure of FIG. 19 is substantially the same as the structure of FIG. 18, except that the passageway 187*d* is directly connected to the passageway 189*d* and the downstream port 190*d*. Accordingly, when fluid is flowing through the valve from the upstream port 181*d* to the port 190*d* and through the adjustable differential pressure valve means 178*d*, the fluid will pass around the flow control valve means 179*d*, and flow from the upper passageway 186*d* directly into the passageway 187*d* and passageway 189*d* and out through the port

190*d*. When fluid is returning through the valve 217, it enters the port 190*d* and passes through the passageways 189*d* and 187*d* and then passes down through the adjustably opened flow control valve means 179*d* and into the bore 188*d*. The fluid then opens the check valve 180*d* and passes through the passageway 203*d*, 201*d* and 182*d* and out through the upstream port 181*d* to provide a meter out function on the fluid returning through the valve 217.

FIGS. 20 through 23 illustrate a still further valve embodiment generally indicated by the numeral 220, which incorporates a pressure reducer function, a flow control meter out function, and a pre-exhaust function. The valve 220 includes a valve body 221, an upper cover 222, and a lower cover 223. The covers 222 and 223 are secured to the valve body 221 by a plurality of suitable screws 224, which extend through the bottom cover 223 and the valve body 221 and threadably engage the top cover 222. Suitable seal means are provided between the cover members 222 and 223 and the valve body 221. The valve body 221 is provided with a supply or upstream pressure port 225 which communicates with an interior lower passageway 226, formed by the combined structure of the valve body 221 and the lower cover 223. Valve body 221 further includes a downstream port 227 which communicates with an interior upper passageway 228, formed by the combined structure of the valve body 221 and the upper cover 222. The upper passageway 228 communicates with the port 227 through the passageway 229.

The valve 220 includes an adjustable differential pressure valve means, generally indicated by the numeral 236, an adjustable fluid flow control valve means, generally indicated by the numeral 235, a check valve means, generally indicated by the numeral 235, and an adjustable pre-exhaust valve means, generally indicated by the numeral 237.

The lower passageway 226 communicates with a vertical bore or passageway 240 which communicates with a valve bore 241. As best seen in FIG. 22, the valve bore 241 communicates sidewardly with the upper passageway 228. The adjustable differential pressure valve means 234 includes a cup-shaped valve body member 242 which is molded from any suitable elastomeric material, as for example, a suitable rubber material. The closed end, or nose, of the body 242 is provided with an integral, axially extended circular projection 243, which is adapted to be seated around the orifice formed at the upper end of the bore 240 for enclosing the same and preventing flow therethrough. The cup-shaped valve member 242 is provided with a suitable cup-shaped metal liner 244 which is made from any suitable material, as for example, stainless steel. The cup-shaped valve member 242 is normally biased to the closed position shown in FIG. 21 by a suitable spring cushion or spring means 245. One end of the spring means 245 is seated in the cup-shaped liner 244, which is inserted in the elastomeric valve body 242. The other end of the spring means 245 is seated against the lower end of a suitable adjustable valve stem 248. The upper end of the valve stem 248 is threadably mounted in a threaded bore 249 in the upper cover 222 and is adapted to be secured in a desired adjusted position by a lock nut 250. The lower end of the valve stem 248 is slidably mounted in a bore 251 which is in alignment with the threaded bore 249. A suitable O-ring seal means 252 is provided on the lower end of the valve stem 248. A gage port 253 is provided, as shown in FIG. 21, in the upper cover 222.

The adjustable flow control valve means 235 includes an adjustable valve stem 256 which carries an integral, conically shaped valve 257 which controls the flow of fluid through the orifice at the upper end of the bore or passageway 255. The passageway 255 communicates at its upper end with the upper passageway 228. The valve stem 256 is mounted in a bore 258 in the upper cover 222, and it is provided with suitable O-ring seal means 259. The upper end of the valve stem 256 is threadably mounted in the upper threaded end 260 of the bore 258, and it is adapted to be secured in any suitable adjusted position by a lock nut 261.

Figure 21:
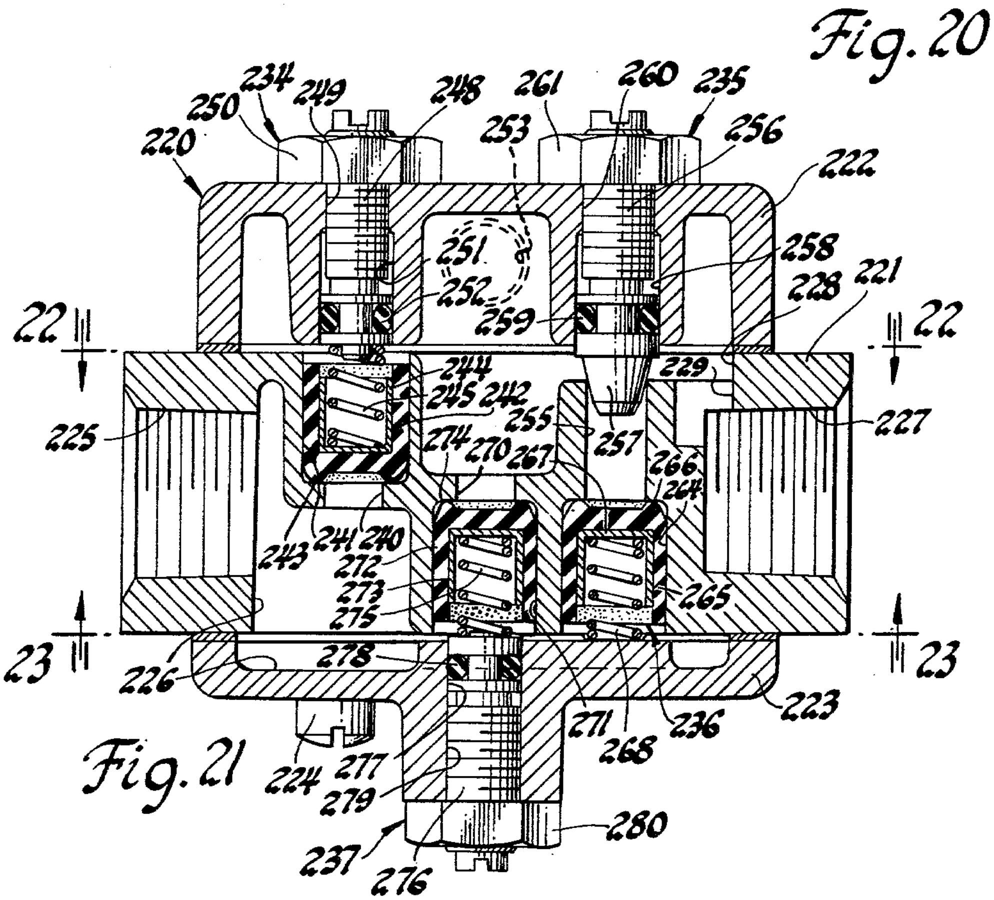
FIG. 21 is an elevation section view of the valve structure illustrated in FIG. 20, taken along the line 21—21, and looking in the direction of the arrows, and showing a meter out action.
Figure 22:
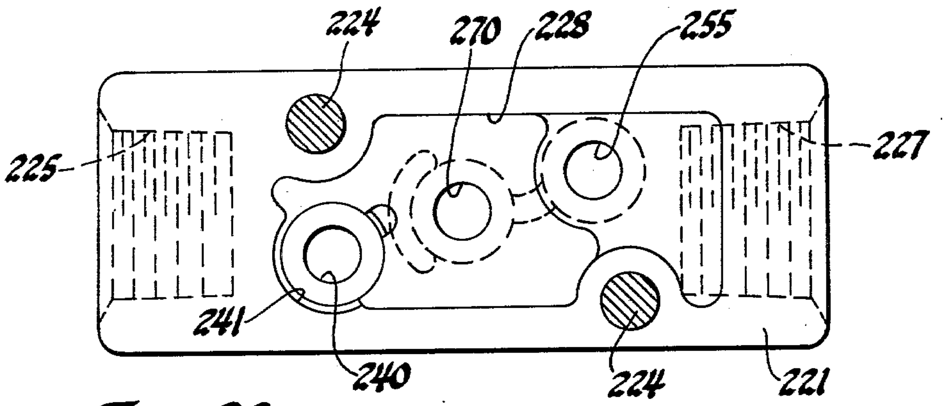
FIG. 22 is a top plan view of the valve body structure illustrated in FIG. 21, with the top cover removed, taken along the line 22—22 thereof, and looking in the direction of the arrows.
Figure 23:
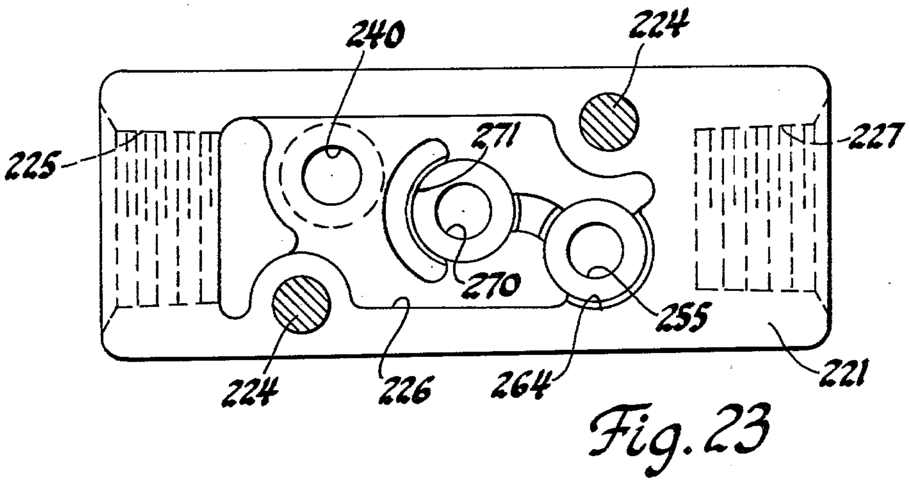
FIG. 23 is a bottom plan view of the valve body structure illustrated in FIG. 21, with a bottom cover removed, taken along the line 23—23 thereof, and looking in the direction of the arrows.

As shown in FIG. 21, the lower end of the passageway 255 communicates with a valve bore 264. As shown in FIG. 23, the valve bore 264 communicates sidewardly with the lower passageway 226. Slidably mounted in the valve bore 264 is the cup-shaped valve body 265 of the check valve 236. The cup-shaped body 265 has an integral, annular axially extended projection 266 which is adapted to be seated around the lower end of the passageway 255 for enclosing the same in a valve closing action. The cup-shaped valve body member 265 is provided with an inserted cup-shaped liner 267, as for example, a stainless steel liner. A suitable spring cushion or spring means 268 has one end seated within the cup-shaped liner 267 and the other end seated against the inner lower surface of the lower cover 223, for normally biasing the check valve 236 into the closed position shown in FIG. 21.

As shown in FIG. 21, the upper passageway 228 communicates through a passageway 270 with a valve bore 271. As shown in FIG. 23, the valve bore 271 communicates sidewardly with the lower passageway 226. The adjustable pre-exhaust valve means 237 includes a cup-shaped valve body member 272 which is made from a suitable elastomeric material and which is provided with a cup-shaped liner 273. The liner 273 is inserted in the valve body member 272, and it may be made from any suitable material, as for example, stainless steel. The cup-shaped valve body member 272 has an integral, annular, axially extended projection 274 which is adapted to be seated around the lower end of the passageway 270 for enclosing the same in a valve closing action.

The cup-shaped valve body member 272 is normally biased to the closed position shown in FIG. 21 by a suitable spring cushion or spring means 275. One end of the spring means 275 is seated in the cup-shaped liner 273. The other end of the spring means 275 is seated against the upper end of a suitable adjustable valve stem 276. The valve stem 276 is slidably mounted in the bore 277 formed in the lower cover 223. A suitable O-ring seal means 278 is provided on the upper end of the valve stem 276. The lower end of the valve stem 276 is threadably mounted in the lower threaded end 279 of the bore 277, and it is adapted to be secured in any suitable adjusted position by a lock nut 280.

In use, the valve 220 receives fluid at the upstream or supply port 225 and it passes into the lower passageway 226 and then up through the passageway 240 and past the adjustable differential pressure valve means 234 and into the upper passageway 228. The fluid then flows down through the passageway 229 and out through the downstream port 227. The valve 220 thus provides a pressure reducing action when fluid is flowing through the valve from left to right, as viewed in FIG. 21. When fluid is exhausted through the valve from right to left, as viewed in FIG. 21, the fluid enters the downstream port 227 and passes upwardly through the passage 229 into the upper passageway 228.

When fluid is exhausted at the supply port 225, the adjustable pre-exhaust valve means 237 opens up immediately to permit downstream pressure to pass from the upper passageway 228 downwardly through the passageway 270, and the bore 271 and into the lower passageway 226 and out the port 225. When the pressure of the exhausting fluid drops to a predetermined level set by the spring means 275 of the adjustable pre-exhaust valve means 237, the pre-exhaust valve means closes. It will be understood that simultaneously with the opening of the pre-exhaust valve 237 that some of the exhausting fluid also passes from the upper passageway 228 downwardly past the adjustable fluid flow control valve means 235 and downwardly into the passageway 255 to open the check valve 236 and then pass through the check valve bore 264 into the lower passageway 226 and out the port 225. However, when the pre-exhaust valve 237 closes, the only exhaust path is through the flow control valve means 235 for a meter out action. It is thus seen that the valve 220 provides a pressure reducing action on the fluid flowing into a device, such as one end of an air cylinder, and a pre-exhaust and flow control action on the exhausting fluid from said one end of the air cylinder. The valve 220 as shown in FIG. 21 thus permits the operation of a device such as an air cylinder in one direction at a lower pressure than supply pressure whereby a savings in air may be achieved. Also, on the return stroke of the air cylinder where it is desired to return the cylinder at a certain speed, the pre-exhaust valve 237 permits the dumping of the pressure resisting the return movement of the cylinder to a predetermined level, whereby the cylinder may be returned at the desired speed and with a minimum use of air which permits a saving of air.

Figure 24:
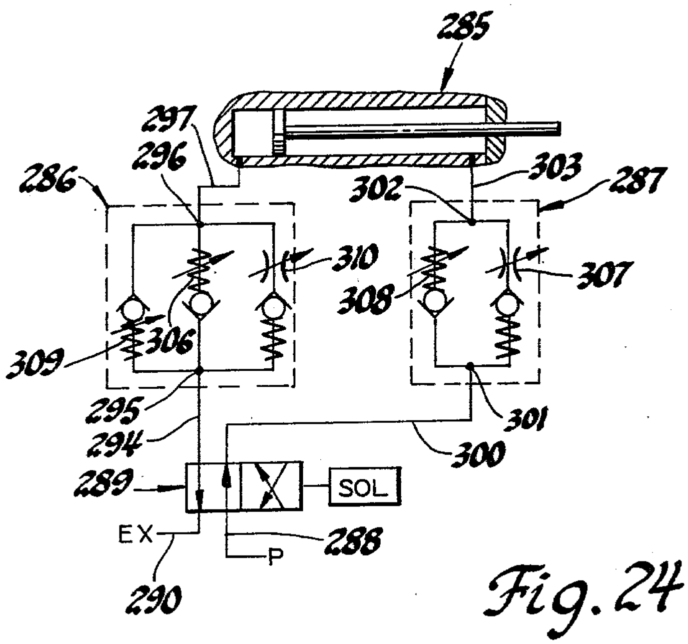
FIG. 24 is a schematic view of an illustrative flow control circuit embodying the use of two valves made in accordance with the principles of the present invention, with one valve provided with meter out and pre-exhaust functions, and another valve provided with a meter out function.

FIG. 24 is a schematic view of an illustrative flow control circuit embodying the use of two valves made in accordance with the principles of the present invention. The numeral 285 generally designates an air cylinder controlled by said two valves. The numeral 286 generally designates a valve of the type illustrated in FIG. 21 which incorporates a pressure reducing function, a flow control function and a pre-exhaust function. The numeral 287 generally designates a valve which provides a pressure reducing function and a flow control function.

The flow control circuit of FIG. 24 illustrates the savings of air that can be accomplished by use of valves in accordance with the present invention. Assuming that the air cylinder 285 was normally operated at 80 psi which was the plant system pressure, but that it could be operated forwardly, or to the right as viewed in FIG. 24, at 60 psi, then a saving of air could be accomplished if the lower pressure could be employed. Also, if the air cylinder 285 could be returned at a reduced pressure to its starting point, or moved to the left as viewed in FIG. 24, then additional saving of air could be achieved. The illustrated valves 286 and 287 provide the aforementioned desired savings of air in the illustration of FIG. 24.

The savings of air accomplished by the flow control circuit of FIG. 24 can be seen from the following explanation of the operation of said circuit. The numeral 289 generally designates a four-way solenoid operated control valve which would be connected to a source of 80 psi plant air through the conduit 288. The conduit 290 is an exhaust conduit for the control valve 289. The control valve 289 would supply air at 80 psi through the conduit 294 to the upstream port 295 of the valve 286. The numeral 306 designates an adjustable differential pressure valve means made in accordance with the invention which would reduce the air pressure to 60 psi at the downstream port 296 from which port the air at said lower pressure would be conveyed to the head end of the air cylinder 285 through the conduit 297. The air in the rod end or right end of the cylinder, as viewed in FIG. 24, would be exhausted, during the last mentioned movement of the cylinder, through the conduit 303 to the downstream port 302 of the valve 287. The air being exhausted from the cylinder rod end of the air cylinder 285 would flow through the flow control and check valve means designated by the numeral 307 to the upstream port 301 of the valve 287, and thence through the conduit 300 to the valve 289 for exhaustion through the conduit 290.

Assuming that the flow control valve means 307 controls the speed of the movement of the air cylinder 285 to the right, but that it could be returned to the left to the cylinder head end at a low pressure, as for example, 20 psi, the flow control arrangement illustrated in FIG. 24 provides a solution for such a situation and further air savings are provided. When the valve 289 is operated to change the direction of the flow of air into the valves 286 and 287, the 80 psi plant air entering the supply port 301 of valve 287 will be reduced by the pressure reducing valve 308 to 20 psi. The air at 20 psi would pass out of the down stream port 302 through the conduit 303 and into the cylinder rod end of the air cylinder 285. In order to permit the cylinder piston to be returned at the low pressure of 20 psi, the pre-exhaust dump valve 309 would be set at a predetermined pressure, as for example, 15 psi, so as to provide a quick release or dump of the air pressure in the head end of the air cylinder 285 and drop it quickly to permit the 20 psi pressure on the cylinder rod end of the cylinder to return the piston to the left, as viewed in FIG. 24. When the air pressure in the head end of the air cylinder 285 has been dropped by the pre-exhaust valve 309 to a predetermined level, the rest of air in the head end of the cylinder is exhausted through the flow control and check valve combination, indicated by the numeral 310, to provide the desired return speed of the cylinder piston.

Figure 25:
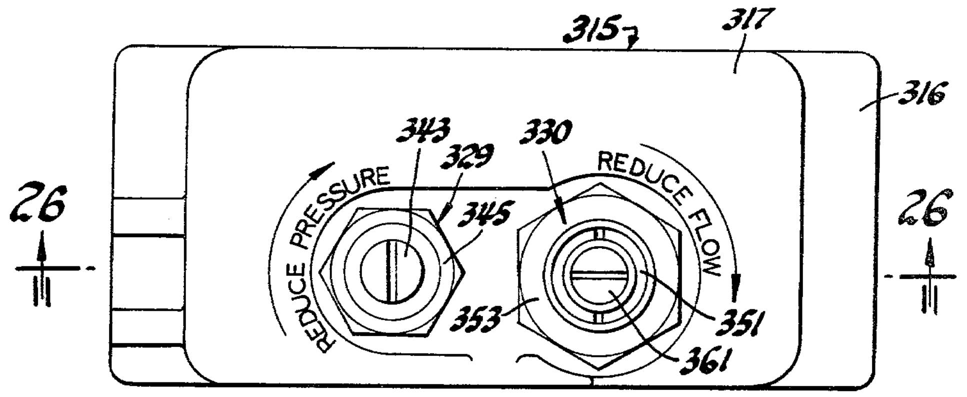
FIG. 25 is a top plan view of another valve embodiment made in accordance with the principles of the present invention.
Figure 26:
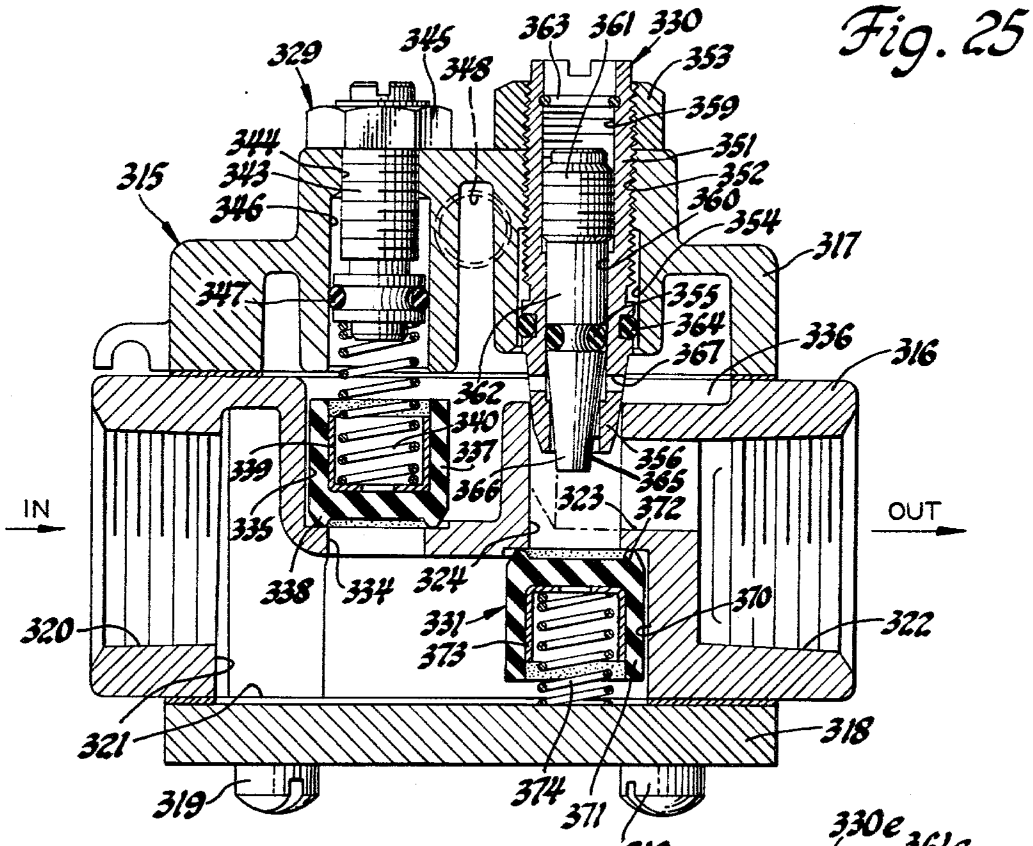
FIG. 26 is an elevation section view of the valve structure illustrated in FIG. 25, taken along the line 26—26 thereof, and looking in the direction of the arrows.

FIGS. 25 and 26 disclose another valve embodiment, generally indicated by the numeral 315, which provides a pressure reducing function and a flow control meter-in function. The valve 315 includes a valve body 316, an upper cover 317, and a lower cover or bottom plate 318. The covers 317 and 318 are secured to the valve body 316 by a plurality of suitable screws 319 which extend through the valve body 316 and threadably engage the top cover 317. Suitable gasket means are provided between the upper and lower covers 317 and 318, respectively, and the valve body 316.

The valve body 316 is provided with a supply or upstream pressure port 320 which communicates with an interior lower passageway 321, formed by the combined structures of the valve body 316 and the lower cover or bottom plate 318. The valve body 316 further includes a downstream port 322, which communicates with an interior upper passageway 336 which is formed by the combined structure of the valve body 316 and the upper cover 317. The downstream port 322 communicates with the upper passageway 336 through a passageway 323 and a vertical valve bore 324. The lower passageway 321 communicates through a vertical bore 334 and a vertical valve bore 335 with the upper passageway 336.

The valve 315 is provided with an adjustable differential pressure valve means, generally indicated by the numeral 329, an adjustable fluid flow control valve means 330, and a check valve means, generally indicated by the numeral 331.

The adjustable differential pressure valve means 329 includes a cup-shaped valve body member 337 which is molded from a suitable elastomeric material, as for example, a suitable rubber material. The closed end, or nose, of the body member 337 is provided with an integral, axially extended circular projection 338, which is adapted to be seated around the orifice formed at the upper end of the bore 334 for enclosing the same and preventing flow therethrough. The cup-shaped valve member 337 is provided with a suitable cup-shaped metal liner 339 which is made from any suitable material, as for example, stainless steel. The cup-shaped valve member 337 is normally biased to the closed position shown in FIG. 26 by a suitable spring cushion or spring means 340. One end of the spring means 340 is seated in the cup-shaped liner 339, which is inserted in the elastomeric valve body 337. The other end of the spring means 340 is seated against the lower end of a suitable adjustable valve stem 343. The upper end of the valve stem 343 is threadably mounted in a threaded bore 344 in the upper cover 317, and it is adapted to be secured in a desired adjusted position by a lock nut or jam nut 345. The lower end of the valve stem 343 is mounted in an enlarged bore 346 ehich is aligned with the threaded bore 344. A suitable O-ring means 347 is provided on the lower end of the valve stem 343. A gauge port 348 is provided, as shown in FIG. 26, in the upper cover 317.

The adjustable flow control valve means 330 comprises an adjustable, double needle valve means that includes an outer tubular needle valve 351 which is threaded on the upper outer periphery thereof so as to be threadably mounted in a vertical bore 352 formed in the upper cover 317 in alignment with the vertical bore 324. The tubular needle valve 351 may be adjusted upwardly or downwardly in the cover 317 and secured in a desired position by a jam nut or lock nut 353.

As shown in FIG. 26, the tubular needle valve 351 is provided on the lower end thereof with an integral, conically shaped valve nose or element 356 which is adapted to control flow through the orifice formed at the upper end of the vertical bore 324. FIG. 26 shows the tubular needle valve 351 adjusted downwardly, so as to have the conically shaped valve element 356 close the orifice at the upper end of the bore 324. An O-ring 364 is mounted around the tubular needle valve 351 in a position just above the conical nose valve element 356 and in slidable engagement in the bore 354 which communicates with the threaded bore 352.

As shown in FIG. 25, a second, solid flow control needle valve is adjustably carried within the tubular needle valve 351 for providing a second flow control needle valve means. The internally mounted solid needle valve comprises an upper threaded end 361 which is threadably mounted within a threaded bore 359 formed in the upper end of the tubular flow control needle valve 351. The upward adjustment movement of the solid needle valve upper end 361 is limited by a C-clip 363 which is releasably mounted in an internal groove formed in the periphery of the threaded bore 359. The internally mounted solid needle valve includes a reduced diameter integral central portion 362 which is integrally connected to a lower integral conically shaped nose or valve element 366. The central portion 362 of the solid needle valve is slidably mounted in a reduced diameter bore 360 which is aligned with the threaded bore 359. A suitable O-ring seal means 355 is operatively mounted around the lower end of the needle valve central portion 362 adjacent the needle nose valve element 366. A reduced diameter bore 365 is formed at the extreme lower end of the tubular needle valve 351 and it communicates at its outer end with the vertical bore 324. The upper or inner end of the bore 324 forms an orifice at the junction point with the larger diameter bore 360 to provide a valve seat for the conical valve element 366. As shown in FIG. 25, the needle valve element 366 is shown in a closed position so as to prevent flow through the bore 365. The tubular needle valve 351 is provided at a point immediately above the valve element 356 with a plurality of transverse bores or passages 367 which communicate the upper passageway 336 with the bores 360 and 365 in the needle valve 351.

As shown in FIG. 26, the lower end of the vertical bore or passage 324 communicates with a valve bore 370 which in turn communicates with the lower passageway 321. Slidably mounted in the valve bore 370 is a cup-shaped valve body 371 of the check valve means 331. The cup-shaped valve body 371 has an integral, annular, axially extended projection 372 which is adapted to be seated around the lower end of the passageway 324 for enclosing the same in a valve closing action. The cup-shaped valve body member 371 is provided with an inserted cup-shaped liner 373, as for example, a stainless steel liner. A suitable spring cushion or spring means 374 has one end seated within the cup-shaped liner 373, and the other end seated against the inner surface of the lower cover or bottom plate 318, for normally biasing the poppet valve or check valve body 371 into the closed position shown in FIG. 26.

The valve 315 functions to provide a pressure reducing action on fluid flowing therethrough when fluid enters the upstream port 320 and passes through the lower passageway 321, the bore 334, the bore 335 and thence into the upper passageway 336. The fllow control needle valve means 330 would be adjusted to allow a controlled flow from the upper passageway 336 and down past the tubular valve element 356 and into the bore 324 and thence into the passage 323, and out the downstream port 322. The inner solid needle valve element 366 may also be adjusted upwardly to a desired opened position to also allow an additional controlled flow of fluid from the passageway 336 through the transverse passages 367 and down through the bore 365 into the bore 324. It will be seen that the double flow control needle valve means 330 permits a large flow control adjustment to be made by the tubular needle valve element 356, and an additional fine or precise flow control adjustment to be made by the inner needle valve element 366. It will be seen that the last described flow of fluid through the valve 315 from the upstream port 320 to the downstream port 322 includes a pressure reducing action and a flow control action. When fluid is returned through the valve 315, it enters the downstream port 332 and passes into the passageway 323 and thence down into the bore 324 and against the poppet valve 331 to open said valve 331 and allow the fluid to flow into the lower passageway 321 and out the upstream port 320, in a free flow action.

Figure 27:
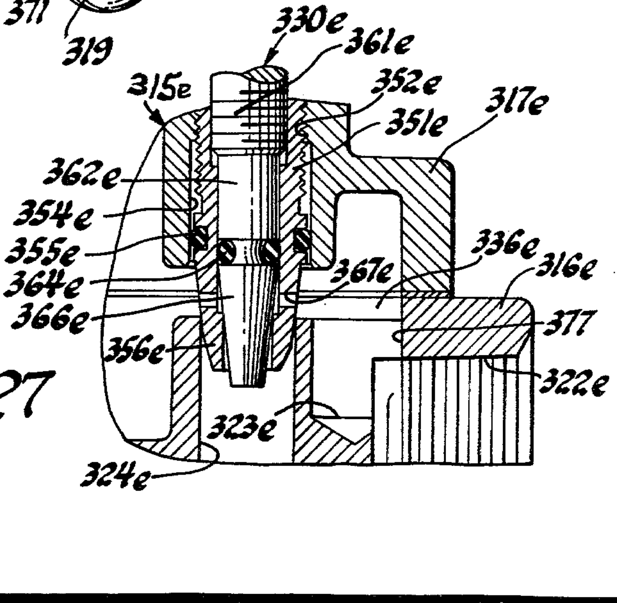
FIG. 27 is a fragmentary elevation section view of a modified embodiment of the valve structure illustrated in FIG. 26.

FIG. 27 is a fragmentary elevation section view of a modified portion of the valve illustrated in FIG. 26 which incorporates the aforedescribed pressure reducing function and a flow control meter out function. The parts of the modified embodiment 315*e* of FIG. 27 which are the same as the valve embodiment 315 of FIG. 26 have been marked with the same reference numerals, followed by the small letter "e". In the embodiment of FIG. 27, the upper passageway 336*e* is directly connected by a bore 377 with the downstream passage 323*e* and the downstream port 322*e*. The vertical bore 324*e* is not directly connected with the downstream port 322*e*, and accordingly, fluid returning through the valve 315*e* to the upstream port must first pass upward through the bore 377 and then downward by the flow control double needle valve means 330*e*. Accordingly, the embodiment of FIG. 27 provides a pressure reducing function when fluid is flowing through the valve from the upstream port to the downstream port 322*e*, and a flow control action on the fluid when it is reversed, and it is flowing from the downstream port 322*e* through the valve 315*e* and out the upstream port. The modified valve embodiment 315*e* of FIG. 27 thus provides a meter out function on fluid returning through the valve.

It will be seen that valves made in accordance with the principles of the present invention function to provide savings of air in the operation of air cylinders and other air operated devices, by providing functions of pressure reducing, flow control and pre-exhaust dumping of pressure. The various combinations which can be employed in flow control circuits using the principles of the present invention, provides a flexible flow control means for many different speed and pressure requirements. An advantage of the present invention is that the aforementioned flow control functions can be provided in valves which are small and compact in construction, economical to make, and efficient in operation.

While it will be apparent that the preferred embodiments of the invention herein disclosed are well calculated to fulfill the objects above stated, it will be appreciated that the invention is susceptible to modification, variation and change.

What is claimed is:

1. In a combination pressure reducer and flow control air valve for controlling fluid flow through a fluid flow circuit which includes a fluid controlled apparatus, the combination comprising:

(a) a valve body and cover means having an upstream port for connection to a source of pressurized fluid, and a downstream port for connection to a fluid controlled apparatus in said fluid flow circuit, and two parallel fluid flow passages interconnecting said ports;

(b) an adjustable differential pressure valve means operatively mounted in a first one of said two parallel fluid flow passages to provide a reduced downstream pressure at the downstream pressure port when the control action of the fluid is in a direction of fluid passing through said first one of said two parallel fluid flow passages and the fluid controlled apparatus is in a static condition, and to maintain said reduced downstream pressure at a fixed differential relative to the pressure at the upstream port during said static condition;

(c) said adjustable differential pressure valve means includes a valve seat, a valve element, a spring means disposed in engagement with said valve element for normally biasing said valve element into engagement with said valve seat, and a valve stem movably mounted in the valve for engagement with the spring means for adjusting the pressure of said spring means on the valve element for determining said fixed differential pressure between the upstream and downstream ports;

(d) a check valve means operatively mounted in the second one of said two parallel fluid flow passages and operative to check the flow of fluid through said second one of said two parallel fluid flow passages when fluid is flowing through said first one of said two parallel fluid flow passages, and to allow flow of fluid through said second one of said two parallel fluid flow passages when fluid is exhausted from said downstream port and through said second one of said two parallel fluid flow passages and out the upstream pressure port; and, (e) an adjustable fluid flow control valve means operatively mounted in one of said two parallel fluid flow passages to provide a metering action to the flow of fluid through the passage in which the adjustable fluid flow control valve means is mounted.

2. A combination pressure reducer and flow control valve structure as defined in claim 1, wherein:

(a) said adjustable fluid flow control valve means is operatively mounted in said second one of said two parallel fluid flow passages to provide a meter out action when fluid is exhausted from said downstream port and through said second one of said two parallel fluid flow passages and out the upstream pressure port.

3. A combination pressure reducer and flow control valve structure as defined in claim 2, wherein:

(a) said check valve means and adjustable flow control valve means are constructed as a unitary valve means to provide both a metered out action and a check valve action.

4. A combination pressure reducer and flow control valve structure as defined in claim 3, wherein said unitary check valve and adjustable flow control valve means comprises:

(a) a poppet valve member.

5. A combination pressure reducer and flow control valve structure as defined in claim 4, wherein said unitary check valve and adjustable flow control valve means includes:

(a) spring means for normally biasing the poppet valve member into a closed position on a valve seat; and, (b) means for limiting the movement of the poppet valve member when it is moved from the normally closed position on a valve seal to a predetermined open position for a flow control operation.

6. A combination pressure reducer and flow control valve structure as defined in claim 5, wherein said means for limiting the movement of the poppet valve member includes:

(a) an adjustable valve stem engageable with the poppet valve member when it is moved to a predetermined open position; and, (b) means for adjusting said valve stem.

7. A combination pressure reducer and flow control valve structure as defined in claim 6, wherein:

(a) said adjustable valve stem is nonrotatable and movable linearly, and it is provided with a threaded portion; and, (b) means for adjusting said valve stem comprises a rotatable knob, which is freely rotatable in the valve cover means, and it is threadably engaged with the valve stem.

8. A combination pressure reducer and flow control valve structure as defined in claim 7, wherein:

(a) the poppet valve member comprises a cup-shaped valve member.

9. A combination pressure reducer and flow control valve structure as defined in claim 8, wherein:

(a) said cup-shaped valve member has a conical valve nose seal.

10. A combination pressure reducer and flow control valve structure as defined in claim 9, wherein:

(a) said conical nose seal includes an annular, radially extended flange which seats on a valve seat, and the inner end of the conical surface of the conical valve seal terminates at the inner end of said flange and precisely engages an orifice formed at the surface of a valve seat when the cup-shaped valve member is in the closed position.

11. A combination pressure reducer and flow control valve structure as defined in claim 1, wherein:

(a) said adjustable fluid flow control valve means is operateively mounted in said first one of said two parallel fluid flow passages to provide a meter in action when fluid is flowing through said first one of two parallel fluid flow passages from said upstream port to said downstream port.

12. A combination pressure reducer and flow control valve structure as defined in claim 1, wherein:

(a) said valve body and cover means includes a third fluid flow passage, which is parallel with said second one of said first mention two parallel fluid flow passages, and interconnects said ports; and, (b) an adjustable pre-exhaust valve means operatively mounted in said third fluid flow passage for exhausting excess pressure from said downstream pressure port and through said third fluid flow passage and out said upstream pressure port.

13. A combination pressure reducer and flow control valve structure as defined in claim 12, wherein:

(a) said adjustable fluid flow control valve means is operatively mounted in said second one of said first mentioned two parallel fluid flow passages to provide a meter out action when fluid is exhausted from said downstream port and through said second one of said first mentioned two parallel fluid flow passages and out the upstream pressure port.

14. A combination pressure reducer and flow control valve structure as defined in claim 12, wherein said adjustable pre-exhaust valve means comprises:

(a) a poppet type valve means.

15. A combination pressure reducer and flow control valve structure as defined in claim 14, wherein said pre-exhaust valve means includes:

(a) spring means for normally biasing the poppet valve member into a closed position.

16. A combination pressure reducer and flow control valve structure as defined in claim 1, wherein:

(a) said adjustable differential pressure valve means valve element comprises a poppet valve means.

17. A combination pressure reducer and flow control valve structure as defined in claim 16, wherein said poppet valve means comprises:

(a) a ball valve means.

18. A combination pressure reducer and flow control valve structure as defined in claim 16, wherein said poppet valve mean comprises:

(a) a flat faced valve seat and a cup-shaped valve member having a flat valve seat for seating on said flat valve seat face.

19. A combination pressure reducer and flow control valve structure as defined in claim 16 wherein said poppet valve means comprises:

(a) a cup-shaped valve member having a conical valve nose seal.

20. A combination pressure reducer and flow control valve structure as defined in claim 1, wherein said adjustable fluid flow control valve means comprises:

(a) a flat faced valve seat and a cup-shaped valve member having a conical valve seal for seating engagement with said flat valve seat face; and, (b) means for adjusting the flow control position of the cup-shaped valve member.

21. A combination pressure reducer and flow control valve structure as defined in claim 20, wherein:

(a) said cup-shaped valve member includes an annular radially extended flange which seats on the flat valve seat face, and the inner end of the conical surface of the valve seal, which terminates at the inner end of said flange, precisely engages the orifice formed at the surface of the flat valve seat face when the cup-shaped valve member is in a closed position.

22. A combination pressure reducer and flow control valve structure as defined in claim 20, wherein said means for adjusting the flow control position of the cup-shaped valve member includes:

(a) an adjustably mounted valve stem which is adjustable to a predetermined open position for a selected fluid flow past the cup-shaped valve member when fluid pressure is exerted on the seal end of the cup-shaped valve member to move the valve member to an open position; and, (b) spring means for normally biasing the cup-shaped valve member into a seating engagement with the valve seat.

23. A combination pressure reducer and flow control valve structure as defined in claim 22, wherein:

(a) said adjustably mounted valve stem is provided with a threaded portion for adjustable movement of the valve stem.

24. A combination pressure reducer and flow control valve structure as defined in claim 1, wherein:

(a) said check valve means comprises a poppet valve means.

25. A combination pressure reducer and flow control valve structure as defined in claim 24, wherein said poppet valve means comprises:

(a) a cup-shaped valve member.

26. A combination pressure reducer and flow control valve structure as defined in claim 25, wherein:

(a) said cup-shaped valve member is provided with a conical valve seal for seating engagement with a valve seat.

27. A combination pressure reducer and flow control valve structure as defined in claim 26, wherein:

(a) said cup-shaped valve member includes an annular radially extended flange which seats on a valve seat, and the inner end of the conical surface of the conical valve seal terminates at the inner end of said flange and precisely engages an orifice formed at the surface of a valve seal face when the cup-shaped valve member is in the closed position.

28. A combination pressure reducer and flow control valve structure as defined in claim 25, wherein:

(a) said cup-shaped valve member is a molded elastomeric member; and, (b) a cup-shaped liner is seated inside of said cup-shaped valve member.

29. A combination pressure reducer and flow control valve structure as defined in claim 28, wherein:

(a) said molded elastomeric member includes an annular, axially extended seal on the exterior of the closed end of the cup-shape for engagement with a valve seat.

30. A combination pressure reducer and flow control valve structure as defined in claim 24, wherein said poppet valve means comprises:

(a) a ball valve means.

31. A combination pressure reducer and flow control valve structure as defined in claim 1, wherein:

(a) said adjustable fluid flow control valve means comprises an adjustable needle type valve means.

32. A combination pressure reducer and flow control valve structure as defined in claim 31, wherein:

(a) said adjustable needle type valve means comprises a plural needle type valve means.

33. A combination pressure reducer and flow control valve structure as defined in claim 32, wherein:

(a) said adjustable plural needle type valve means include a tubular needle type valve and a solid needle type valve adjustably mounted in said tubular needle type valve.

34. A combination pressure reducer and flow control valve structure as defined in claim 33, wherein:

(a) said adjustable plural needle type valve means is operatively mounted in said first one of said two parallel fluid flow passages to provide a meter in action when fluid is flowing through said first one of said two parallel fluid flow passages from said upstream port to said downstream port.

35. A combination pressure reducer and flow control valve structure as defined in claim 33, wherein:

(a) said adjustable plural needle type valve means is operatively mounted in said second one of said two parallel fluid flow passages to provide a meter out action when fluid is exhausted from said downstream port and through said second one of said two parallel fluid flow passages and out the upstream pressure port.

36. In a combination pressure reducer and flow control air valve for controlling fluid flow through a fluid flow circuit which includes a fluid controlled apparatus, the combination comprising:

(a) a valve body and cover means having an upstream port for connection to a source of pressurized fluid and a downstream port for connection to a fluid controlled apparatus in said fluid flow circuit, and two parallel fluid flow passages interconnecting said ports;

(b) an adjustable differential pressure valve means operatively mounted in a first one of said two parallel fluid flow passages to provide a reduced downstream pressure at the downstream pressure port when the control action of the fluid is in a direction of fluid passing through said first one of said two parallel fluid flow passages and the fluid controlled apparatus is in a static condition, and to maintain said reduced downstream pressure at a fixed differential relative to the pressure at the upstream port during said static condition;

(c) a check valve means operatively mounted in the second one of said two parallel fluid flow passages and operative to check the flow of fluid through said second one of said two parallel fluid flow passages when fluid is flowing through said first one of said two parallel fluid flow passages, and to allow flow of fluid through said second one of said two parallel fluid flow passages when fluid is exhausted from said downstream port and through said second one of said two parallel fluid flow passages and out the upstream pressure port;

(d) an adjustable fluid flow control valve means operatively mounted in one of said two parallel fluid flow passages to provide a metering action to the flow of fluid through the passage in which the adjustable fluid flow control valve means is mounted;

(c) said adjustable differential pressure valve means comprising a poppet valve means; and, (f) means for adjusting the pressure on the adjustable differential pressure valve means including a spring means in engagement with the poppet valve means, and means for applying pressure to the spring means.

37. In a combination pressure reducer and flow control valve the combination comprising:

(a) a valve body and cover means having an upstream port and a downstream port, and two parallel fluid flow passages interconnecting said ports;

(b) an adjustable differential pressure valve means operatively mounted in a first one of said two parallel fluid flow passages to provide a reduced downstream pressure at the downstream pressure port when fluid is passing through said first one of said two parallel fluid flow passages;

(c) a check valve means operatively mounted in the second one of said two parallel fluid flow passages and operative to check the flow of fluid through said second one of said two parallel fluid flow passages when fluid is flowing through said first one of said two parallel fluid flow passages and to allow flow of fluid through said second one of said two parallel fluid flow passages when fluid is exhausted from said downstream port and through said second one of said two parallel fluid flow passages and out the upstream pressure port;

(d) an adjustable fluid flow control valve means operatively mounted in one of said two parallel fluid flow passages to provide a metering action to the flow of fluid through the passage in which the adjustable fluid flow control valve means is mounted;

(e) said adjustable differential pressure valve means comprising a poppet valve means;

(f) said poppet valve means comprising a cup-shaped valve member having a conical valve nose seal;

(g) means for adjusting the pressure on the adjustable differential pressure valve means; and, (h) said means for adjusting the pressure on the adjustable differential pressure valve means comprising:

(1) a spring cushion means seated in engagement with the cup-shaped valve member; and, (2) means for adjusting the pressure of the spring cushion means on the cup-shaped valve member.

38. A combination pressure reducer and flow control valve structure as defined in claim 37, wherein said means for adjusting the pressure of the spring cushion means comprises:

(a) an adjustable valve stem engageable with said spring means; and, (b) means for adjusting said valve stem.

39. A combination pressure reducer and flow control valve structure as defined in claim 38, wherein:

(a) said adjustable valve stem is nonrotatable and movable linearly, and it is provided with a threaded portion; and, (b) said means for adjusting said valve stem comprises a rotatable knob which is freely rotatable in the valve cover means, and it is threadably engaged with the threaded portion of the valve stem.

40. A combination pressure reducer and flow control valve structure as defined in claim 38, wherein:

(a) said cup-shaped valve member is a molded elastomer member; and, (b) a cup-shaped liner is seated inside of said cup-shaped valve member.

41. A combination pressure reducer and flow control valve structure as defined in claim 40, wherein:

(a) said molded elastomeric member includes an annular, axially extended seal on the exterior of the closed end of the cup-shape for engagement with a valve seat.

* * * * *

UNITED STATES PATENT OFFICE
CERTIFICATE OF CORRECTION

Patent No 4,195,552 Dated April 1, 1980

Inventor(s) James A. Neff

It is certified that error appears in the above-identified patent and that said Letters Patent are hereby corrected as shown below:

Column 13, line 33, "236" should be --234--.

Column 13, line 35, "235" should be --236--.

Column 18, line 64, "332" should be --322--.

Signed and Sealed this

*Twenty-fourth* Day of *June 1980*

[SEAL]

*Attest:*

SIDNEY A. DIAMOND

*Attesting Officer* *Commissioner of Patents and Trademarks*